United States Patent
Lu et al.

(10) Patent No.: US 11,594,011 B2
(45) Date of Patent: Feb. 28, 2023

(54) DEEP LEARNING-BASED FEATURE EXTRACTION FOR LIDAR LOCALIZATION OF AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Weixin Lu, Beijing (CN); Yao Zhou, Beijing (CN); Guowei Wan, Beijing (CN); Shenhua Hou, Beijing (CN); Shiyu Song, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 663 days.

(21) Appl. No.: 16/337,387

(22) PCT Filed: Jan. 30, 2019

(86) PCT No.: PCT/CN2019/073975
§ 371 (c)(1),
(2) Date: Mar. 27, 2019

(87) PCT Pub. No.: WO2020/154970
PCT Pub. Date: Aug. 6, 2020

(65) Prior Publication Data
US 2021/0365712 A1    Nov. 25, 2021

(51) Int. Cl.
*G06K 9/00*  (2022.01)
*G06V 10/46* (2022.01)
(Continued)

(52) U.S. Cl.
CPC ............ *G06V 10/462* (2022.01); *G01S 17/89* (2013.01); *G06N 3/0454* (2013.01); *G06N 3/08* (2013.01);
(Continued)

(58) Field of Classification Search
CPC ...... G06K 9/4671; G06K 9/2054; G06T 7/70; G06T 2207/30248; G01S 17/89; G06N 3/0454; G06N 3/08
See application file for complete search history.

(56) References Cited

U.S. PATENT DOCUMENTS 10,309,778 B2 * 6/2019 Zhang ................... G01C 21/32
10,915,793 B2 * 2/2021 Corral-Soto ......... G06V 10/454
(Continued)

FOREIGN PATENT DOCUMENTS

| CN | 108345831 A | 7/2018 |
|---|---|---|
| WO | 2018104563 A2 | 6/2018 |
| WO | 2018142395 A1 | 8/2018 |

OTHER PUBLICATIONS

Yao et al., "MVSNet: Depth Inference for Unstructured Multi-view Stereo", the Hong Kong University of Science and Technology, Shenzhen Zhuke Innovation Technology (Altizure), arXiv:1804.02505v2 [cs.CV], Jul. 2018, 17 pages.
(Continued)

*Primary Examiner* — Oneal R Mistry
(74) *Attorney, Agent, or Firm* — Womble Bond Dickinson (US) LLP

(57) ABSTRACT

In one embodiment, a method for extracting point cloud features for use in localizing an autonomous driving vehicle (ADV) includes selecting a first set of keypoints from an online point cloud, the online point cloud generated by a LiDAR device on the ADV for a predicted pose of the ADV; and extracting a first set of feature descriptors from the first
(Continued)

set of keypoints using a feature learning neural network running on the ADV, The method further includes locating a second set of keypoints on a pre-built point cloud map, each keypoint of the second set of keypoints corresponding to a keypoint of the first set of keypoint; extracting a second set of feature descriptors from the pre-built point cloud map; and estimating a position and orientation of the ADV based on the first set of feature descriptors, the second set of feature descriptors, and a predicted pose of the ADV.

21 Claims, 17 Drawing Sheets

(51) Int. Cl.
  G06T 7/70 (2017.01)
  G01S 17/89 (2020.01)
  G06N 3/04 (2023.01)
  G06N 3/08 (2023.01)
  G06V 10/22 (2022.01)

(52) U.S. Cl.
  CPC .............. G06T 7/70 (2017.01); G06V 10/22 (2022.01); *G06T 2207/30248* (2013.01)

(56) References Cited

U.S. PATENT DOCUMENTS

| | | | |
|---|---|---|---|
| 11,022,693 B1* | 6/2021 | Allais | G05D 1/024 |
| 11,079,492 B1* | 8/2021 | Stumm | G01S 7/4808 |
| 2015/0254857 A1 | 9/2015 | Huang et al. | |
| 2015/0331111 A1 | 11/2015 | Newman et al. | |
| 2018/0315209 A1* | 11/2018 | Murphy-Chutorian | G06T 7/579 |
| 2019/0147341 A1* | 5/2019 | Rabinovich | G06K 9/4628 382/156 |
| 2019/0171870 A1* | 6/2019 | Vajda | G06T 7/75 |
| 2019/0220993 A1* | 7/2019 | Li | G06T 7/73 |
| 2020/0160559 A1* | 5/2020 | Urtasun | G06K 9/629 |
| 2020/0175720 A1* | 6/2020 | Hsu | H04N 13/156 |
| 2020/0202566 A1* | 6/2020 | Keserich | H04N 5/23222 |

OTHER PUBLICATIONS

Weinmann et al., "Semantic Point Cloud Interpretation Based on Optimal Neighborhoods, Relevant Features and Efficient Classifiers", ISPRS Journal on Photogrammetry and Remote Sensing 105, www.elsevier.com/locate/isprsjprs, 2015, pp. 286-304.

Wan et al., "Robust and Precise Vehicle Localization based on Multi-sensor Fusion in Diverse City Scenes",arXiv:1711.05805v1 [cs.CV], Nov. 2017, 8 pages.

Qi et al., "PointNet: Deep Learning on Point Sets for 3D Classification and Segmentation", Stanford University, arXiv:1612.00593v2 [cs.CV], Apr. 2017, 19 pages.

Qi et al., "PointNet++: Deep Hierarchical Feature Learning on Point Sets in a Metric Space", Stanford University, 31st Conference on Neural Information Processing Systems (NIPS 2017), Long Beach, CA, 10 pages.

Levinson et al., "Robust Vehicle Localization in Urban Environments Using Probabilistic Maps", Stanford Artificial Intelligence Laboratory, 2010 IEEE International Conference on Robotics and Automation, Anchorage Convention District, Anchorage, Alaska, May 2010, 7pages.

Levinson et al., "Map-Based Precision Vehicle Localization in Urban Environments", Stanford Artificial Intelligence Laboratory, Robotics: Science and Systems 2007, Atlanta, GA, Jun. 2007, 8 pages.

Kendall et al., "End-to-End Learning of Geometry and Context for Deep Stereo Regression", ICCV-2017 paper, Computer Vision Foundation, 10 pages.

Donahue et al., "Long-term Recurrent Convolutional Networks for Visual Recognition and Description", arXiv:1411.4389v4 [cs.CV], May 31, 2016, 14 pages.

\* cited by examiner

DEEP LEARNING-BASED FEATURE EXTRACTION FOR LIDAR LOCALIZATION OF AUTONOMOUS DRIVING VEHICLES

CROSS-REFERENCE TO RELATED APPLICATION

This patent application is a U.S. National Phase Application under 35 U.S.C. § 371 of International Application No. PCT/CN2019/073975, filed Jan. 30, 2019, entitled "DEEP LEARNING-BASED FEATURE EXTRACTION FOR LIDAR LOCALIZATION OF AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to point cloud feature extraction for autonomous vehicle localization.

BACKGROUND

Autonomous driving vehicles (ADV) can relieve occupants, especially the driver, from some driving-related responsibilities. When operating in an autonomous mode, a vehicle can navigate to various locations using onboard sensors and high definition maps, allowing the vehicle to travel with minimal human interaction or in some cases without any passengers.

To drive safely, an ADV needs to precisely and reliably estimate its position and orientation. Ideally, the positioning of the ADV needs to be accurate to centimeters and sub-degree attitudes. Existing localization approaches using light detection and ranging (LiDAR) scanners typically require several stages in a localization pipeline. Although some of the existing approaches have excellent performance in terms of localization accuracy and robustness across different scenarios, they usually require substantial engineering efforts in hardcoding and tuning some of the stages in the pipeline, and have strong preferences over certain scenarios. On the other hand, although neural networks have been used to process semantics and have achieved good results, the neutral networks are lacking in solving tasks related to 3D geometry, e.g., localization problems.

SUMMARY

In a first aspect, the present disclosure provides a computer-implemented method for extracting point cloud features for use in localizing an autonomous driving vehicle (ADV), the method comprising: selecting a first set of keypoints from an online point cloud, the online point cloud generated by a light detection and ranging (LiDAR) device on the ADV; extracting a first set of feature descriptors for the first set of keypoints using a feature learning neural network running on the ADV; locating a second set of keypoints on a pre-built point cloud map, each keypoint of the second set of keypoints corresponding to a keypoint of the first set of keypoint; extracting a second set of feature descriptors from the pre-built point cloud map; and estimating a position and orientation of the ADV based on the first set of feature descriptors, the second set of feature descriptors, and a predicted pose of the ADV.

In a second aspect, the present disclosure provides a non-transitory machine-readable medium having instructions stored therein, which when executed by a processor, cause the processor to perform operations, the operations comprising: selecting a first set of keypoints from an online point cloud, the online point cloud generated by a light detection and ranging (LiDAR) device on the ADV; extracting a first set of feature descriptors for the first set of keypoints using a feature learning neural network running on the ADV; locating a second set of keypoints on a pre-built point cloud map, each keypoint of the second set of keypoints corresponding to a keypoint of the first set of keypoint; extracting a second set of feature descriptors from the pre-built point cloud map; and estimating a position and orientation of the ADV based on the first set of feature descriptors, the second set of feature descriptors, and a predicted pose of the ADV.

In a third aspect, the present disclosure provides a system for extracting point cloud features for use in localizing an autonomous driving vehicle (ADV), the system comprising: a processor; and a memory coupled to the processor to store instructions, which when executed by the processor, cause the processor to perform operations, the operations including: selecting a first set of keypoints from an online point cloud, the online point cloud generated by a light detection and ranging (LiDAR) device on the ADV; extracting a first set of feature descriptors for the first set of keypoints using a feature learning neural network running on the ADV; locating a second set of keypoints on a pre-built point cloud map, each keypoint of the second set of keypoints corresponding to a keypoint of the first set of keypoint; extracting a second set of feature descriptors from the pre-built point cloud map; and estimating a position and orientation of the ADV based on the first set of feature descriptors, the second set of feature descriptors, and a predicted pose of the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
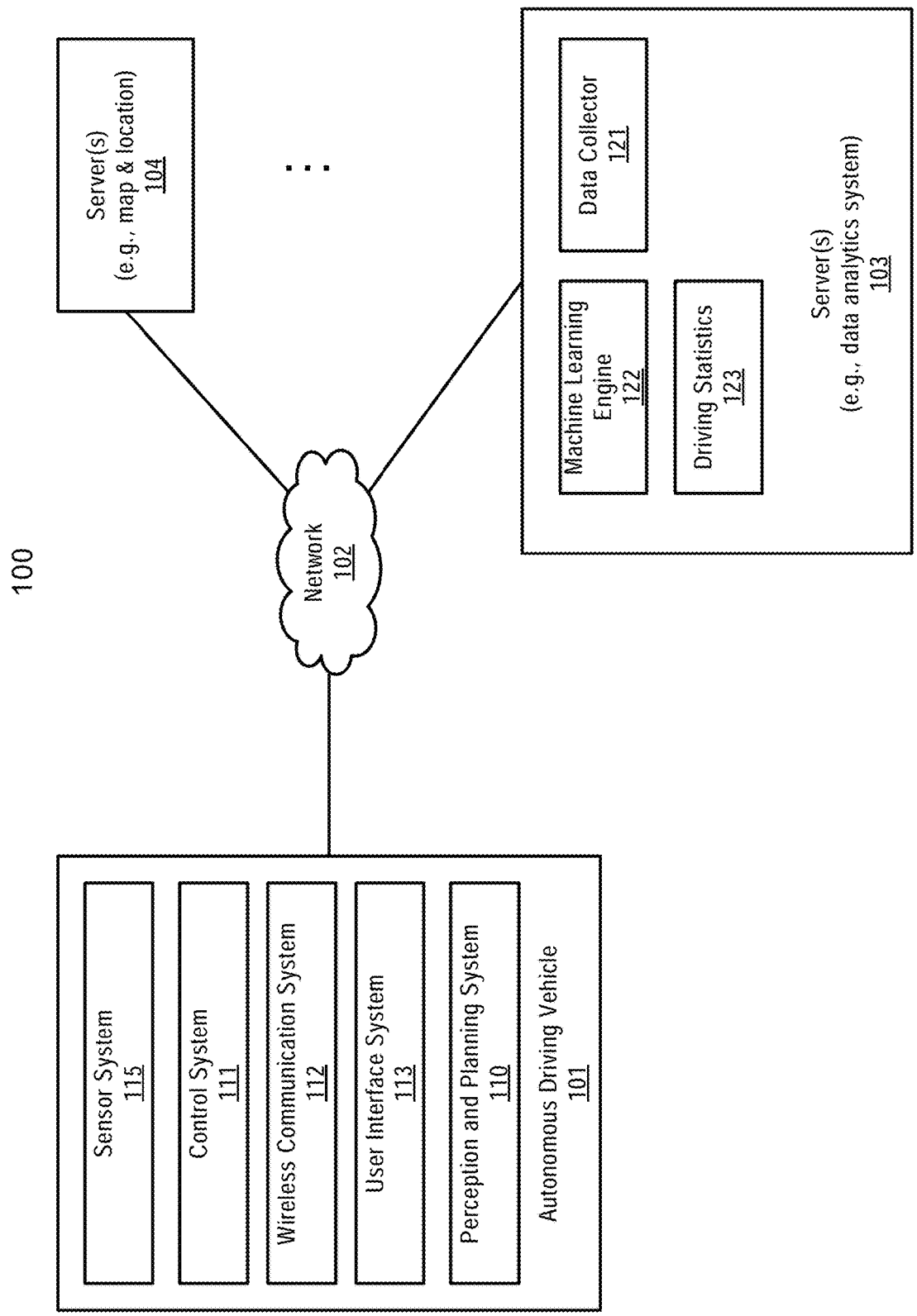
FIG. 1 is a block diagram illustrating an autonomous vehicle network configuration according to one embodiment of the disclosure.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, described herein is a learning-based LiDAR localization system including multiple neutral networks for use by an ADV. The learning-based LiDAR localization system can match the performance of the state-of the-art handcrafted localization systems without the requirement of substantial engineering work to hardcode the handcrafted systems.

In one embodiment, the learning-based LiDAR localization system can receive an online LiDAR point cloud, a pre-built 3D point cloud map, and a predicted pose of an ADV as inputs, learn features from the online LiDAR point cloud and the pre-built 3D point cloud map, and construct a cost volume over a solution space. The learning-based LiDAR localization system can apply convolution neural networks (CNNs) and recurrent neural networks (RNNs) to the cost volume to estimate an optimal pose of the ADV.

The learning-based LiDAR localization system can achieve high-accuracy (e.g., centimeter-level) localization, which is comparable to prior state-of-the-art systems with hand-crafted pipelines. The learning-based LiDAR localization system uses various deep neural network structures to establish a learning-based approach, rather than relying on handcrafted modules. Extracted local feature descriptors of point clouds can be specifically optimized for matching in a variety of real-world driving scenarios. The convolution neural networks applied to the cost volume that has been built in a solution space can significantly boost the localization accuracy of the ADV. As used herein, in one embodiment, a solution space is a set of possible points of an optimization problem that satisfy the problem constraints. For example, the LiDAR points selected for estimating optimal pose of an ADV can be considered a solution space.

In one embodiment, the learning based LiDAR localization system is driven by data that can be automatically or semi-automatically collected in large volumes using offline methods. The large volumes of data include ground truth trajectories, and may be used to train the localization system for localization tasks. The learning based LiDAR localization system requires minimum human labeling efforts for the data, and therefore is generally more cost-effective.

In one embodiment, the predicted pose can be generated by an inertial measurement unit (IMU) of the ADV or a vehicle dynamics model of the ADV, and can measure incremental motions between consecutive LiDAR frames. The predicted pose may diverge from the ground truth pose of the ADV, resulting in an offset. As such, recovering the offset is equivalent to estimating the vehicle location. The learning-based LiDAR localization system can generate an optimal offset between the predicted pose and the ground truth pose by minimizing a matching cost between the online point cloud and the pre-built 3D point cloud map. In one embodiment, the optimal offset can include a 2D horizontal offset and a heading offset.

In one embodiment, the online point cloud can be a single or several consecutive frames accumulated from multiple LiDAR scans from a LiDAR device mounted on the ADV. The online point cloud can be represented as a set of 3D LiDAR points, where each LiDAR point can be a vector including coordinates and reflection intensity of the LiDAR point in the local vehicle or in a LiDAR coordinate system. The online point cloud takes motion compensation of the ADV into consideration. Therefore, as the ADV moves from point A to point B, the online point cloud of the ADV would be different at point A and point B.

In one embodiment, the pre-built 3D point cloud map can be a collection of LiDAR points with global coordinates. The LiDAR points can be collected by surveying or mapping vehicles, and can be down-sampled using a voxel grid filter for storage efficiency. In addition, dynamic objects (e.g., vehicles, bicycles and pedestrians) may be removed from the pre-built 3D point cloud map through semantic segmentation using a training neural network model (e.g., PointNet++).

In one embodiment, a method for extracting point cloud features for use in localizing an autonomous driving vehicle (ADV) includes selecting a first set of keypoints from an online point cloud, the online point cloud generated by a LiDAR device on the ADV; and extracting a first set of feature descriptors for the first set of keypoints using a feature learning neural network running on the ADV. The method further includes locating a second set of keypoints on a pre-built point cloud map, each keypoint of the second set of keypoints corresponding to a keypoint of the first set of keypoint; extracting a second set of feature descriptors from the pre-built point cloud map; and estimating a position and orientation of the ADV based on the first set of feature descriptors, the second set of feature descriptors, and a predicted pose of the ADV.

In one embodiment, the method further includes constructing a cost value from the first set of feature descriptors extracted and the second of feature descriptors. Each cell (i.e. sub volume) in the cost volume represents a matching cost between one of the first set of keypoints and a corresponding keypoints of the second set of keypoints with a given offset. The cost volume can be reduced and regularized for use by a numerous different types of neural networks to obtain an optimal offset to determine an optimal pose of the ADV.

In one embodiment, each of the first set of keypoints and the second of keypoints is a LiDAR point. The first set of keypoints and the second set of keypoints have a fixed number of keypoints. When selecting the first set of keypoints, the following operations can be performed: traversing LiDAR points in a predetermined area around the predicted pose of the ADV to locate a number of candidate LiDAR points, each candidate LiDAR point having a predetermined density of LiDAR points in a neighborhood of that candidate LiDAR point; and evaluating a linearity of each of the candidate LiDAR points using a 3D structure tensor. The linearity of each candidate LiDAR points can be assigned a value based on the evaluation. The candidate LiDAR points can be sorted based on their assigned values. The fixed number of candidate LiDAR points can be selected based on the sorted candidate LiDAR points. When selecting the fixed number of candidate LiDAR points, each newly selected LiDAR point needs to maintain a predetermined distance from one or more existing LiDAR points that have been selected.

In one embodiment, the feature learning neural network includes numerous mini-neural networks. Each mini-neural network can be provided for one of the first set of keypoints. Each mini-neural neural network can apply a cylinder along a z-axis of the keypoint to collect a predetermined number of neighboring LiDAR points, each neighboring LiDAR point having a reflection intensity and a relative coordinate to that keypoint. Each mini-neural network can further extract a feature descriptor for the keypoint based on the relative coordinates and reflection intensities of the associated neighboring LiDAR points. Similarly, each mini-neural network can be provided for one of the second set of keypoints, and can be used to extract a feature descriptor for the keypoint in the second set of keypoints based on relative coordinates and reflection intensities of neighboring LiDAR points of the keypoint. Coordinates for each of the second set of keypoints on the pre-built point cloud map can be computed using a transform expressed by a 2 by 2 rotation matrix and 2D translation vector.

In one embodiment, in the event that the predetermined number of neighboring LiDAR points are not found for a keypoint in the second set of keypoints, a fully connected network can be used to extract a feature descriptor for the keypoint where the input to the network can be set as a unit vector.

In one embodiment, a method for solution inference using neural networks in LiDAR localization includes constructing a cost volume in a solution space for a predicted pose of the ADV, the cost volume including a number of sub volumes, each sub volume representing a matching cost between a keypoint from an online point cloud and a corresponding keypoint on a pre-built point cloud map. The method further includes regularizing the cost volume using convention neural networks (CNNs) to refine the matching costs; and inferring, from the regularized cost volume, an optimal offset of the predicted pose. The optimal offset can be used to determining a location of the ADV.

In one embodiment, each CNN shares a same set of parameters, and includes multiple conventional layers. At least one of the conventional layers is a 3D conventional layer that uses a batch normalization and a rectified linear unit (ReLU).

In one embodiment, the solution space of the predicted pose includes a space defined by a set of keypoints selected from the online point cloud. Each of the set of keypoints is associated with a predetermined number of neighboring points and has a minimum distance from the rest of the set of keypoints.

In one embodiment, constructing the cost volume further includes computing a metric distance between each pair of corresponding feature descriptors. The metric distance is a multi-dimensional vector, in which each element is calculated by squaring a distance from the corresponding one in the descriptor pair. In addition, when constructing the cost volume, the solution space can be divided into multiple discrete spaces, each discrete space corresponding to a keypoint.

For each discrete space, a size of a x dimension, a y dimension and a yaw dimension can be determined based on a space occupied by the corresponding keypoint and its associated neighboring LiDAR points. Subsequently, the cost volume can be constructed based on a number of feature descriptors for the predicted pose and the size of each dimension for each discrete space. Each sub volume of the cost volume can be associated with a keypoint from the online point cloud with its associated feature descriptor, a transformation, and a corresponding feature descriptor from the pre-built point cloud map.

In one embodiment, a method for temporal smoothness in localization results for an ADV includes: creating a probability offset volume that represents an overall matching cost between a first set of keypoints from the online point cloud and a second set of keypoints from a pre-built point cloud map for each of a series of sequential light detection and ranging (LiDAR) frames in an online point cloud. The method also includes compressing the probability offset volume into multiple probability vectors across a x dimension, a y dimension and a yaw dimension; providing each probability vector of the probability offset volume to a number of recurrent neural networks (RNNs); and generating, by the RNNs, a trajectory of location results across the plurality of sequential LiDAR frames.

In one embodiment, the probability offset volume includes multiple sub volumes, each sub volume representing an overall matching cost between the online point cloud and the pre-built point cloud map for a particular location offset of the ADV. Each RNN includes multiple long short term memory (LSTM) units. Each probability vector is provided as an input to one of the LSTM units. The RNNs smoothen the trajectory of location results across the sequential LiDAR frames based on learned historical information from the sequential LiDAR frames. The ADV can have multiple predicted poses across the sequential LiDAR frames.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
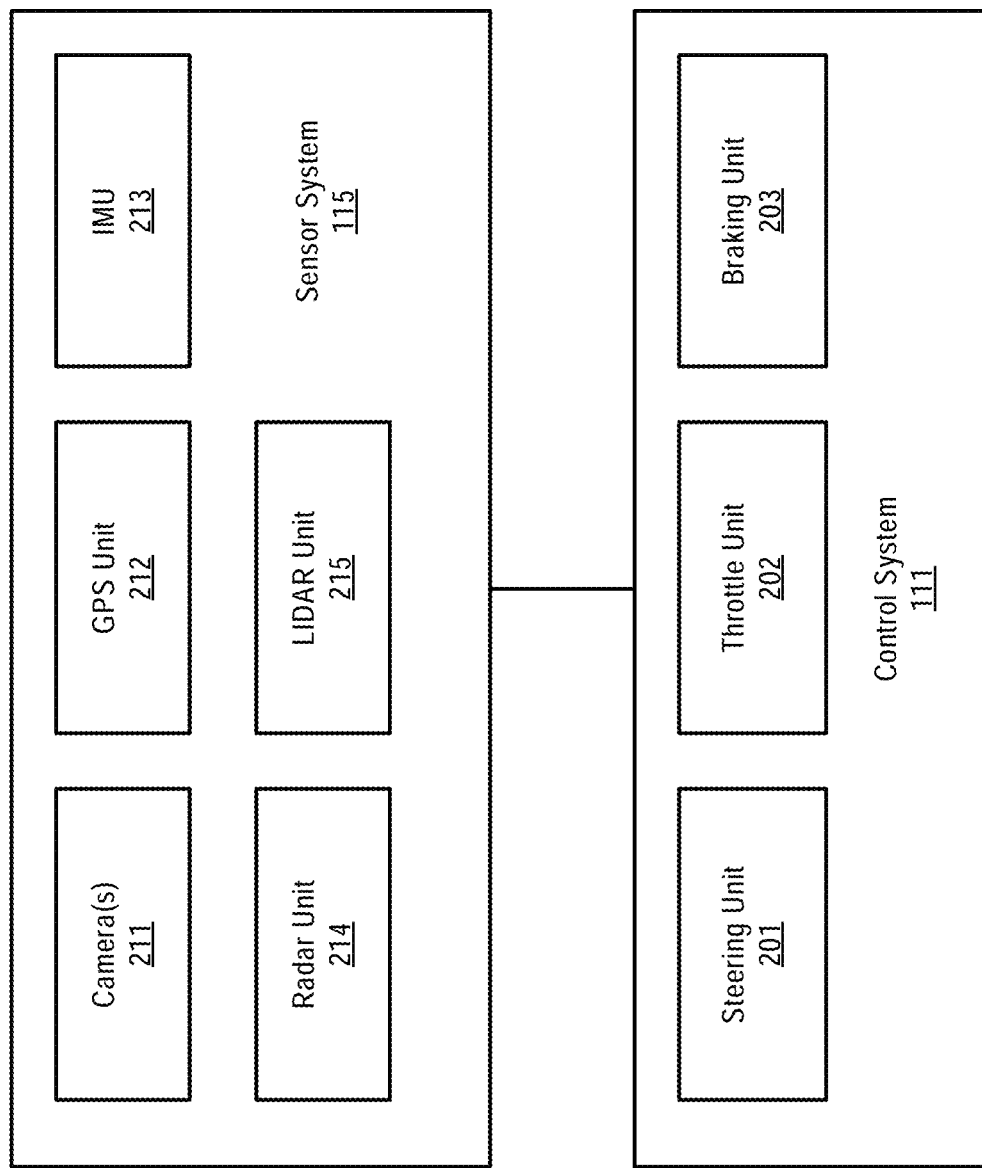
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms/models 124 include the algorithms and models for LIDAR localization processes as described in details further below. Algorithms 124 can then be uploaded on ADVs to be utilized during autonomous driving in real-time.

Figure 3A:
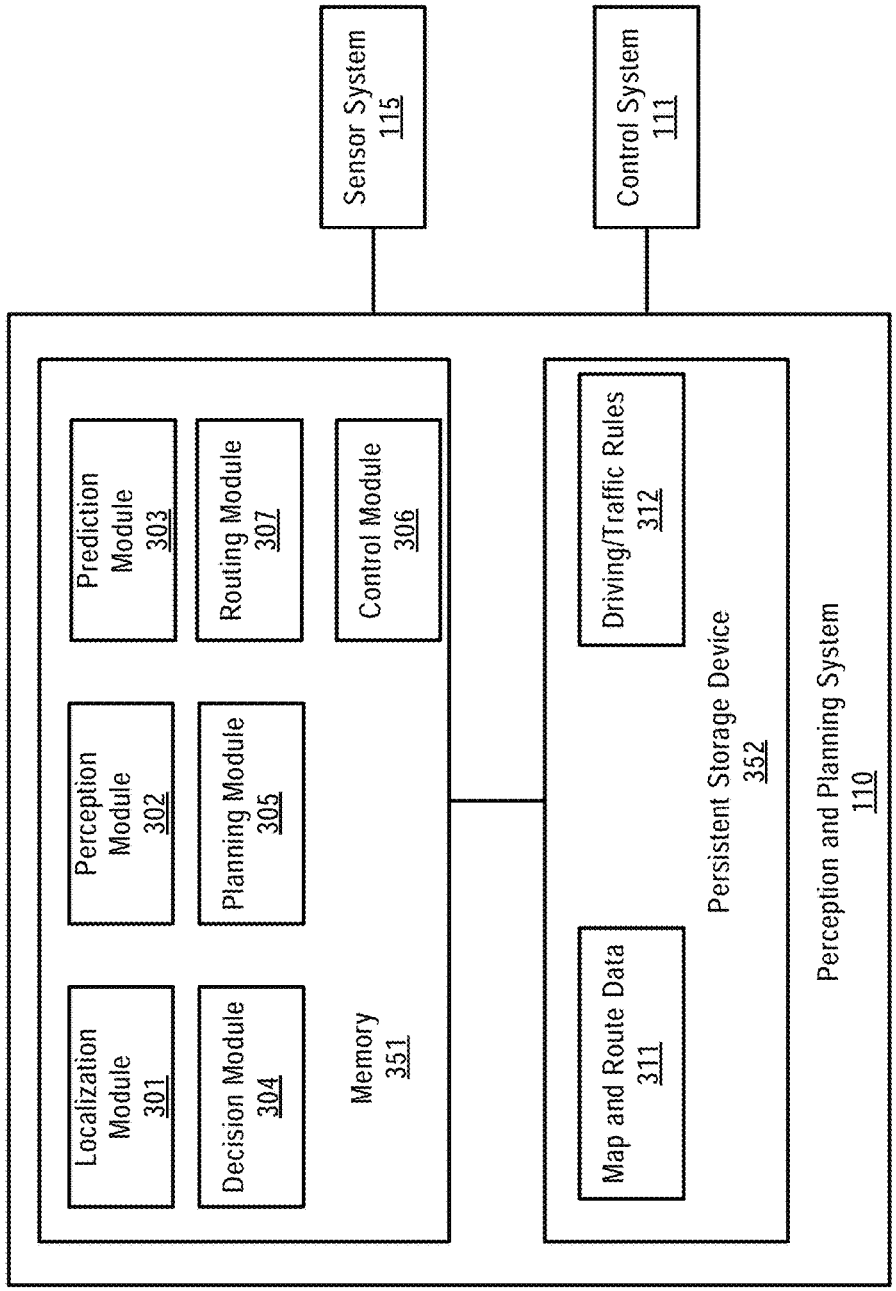
FIGS. 3A-3B are block diagrams illustrating an example of a perception and planning system used with an autonomous vehicle according to one embodiment.
Figure 3B:
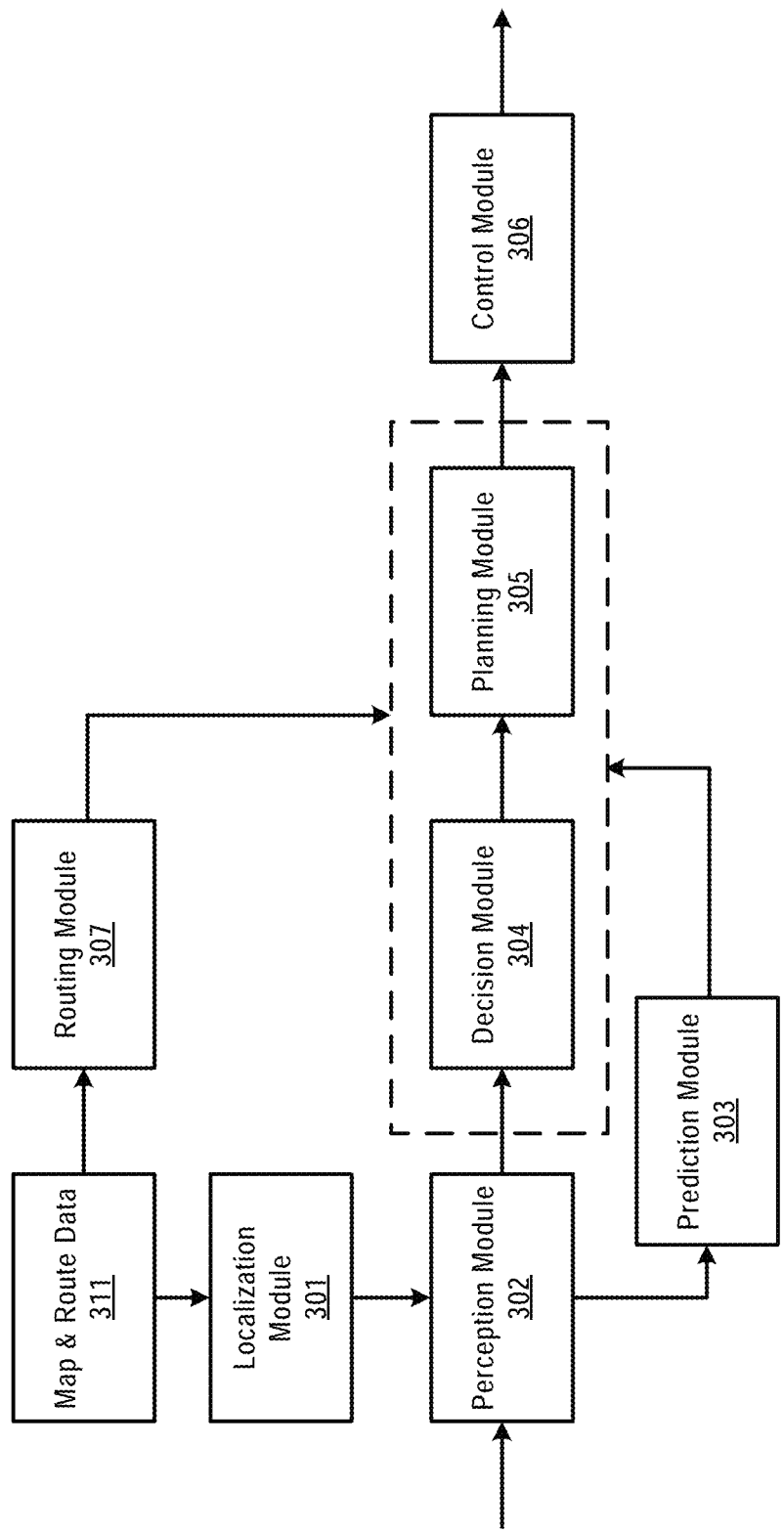

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Map and route data 311 can also be used by the perception module 302 in object detection. For example, features can be extracted from map and route data 311 and can be combined with features extracted from a point cloud to detect objects by the ADV.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Point Cloud Feature Extraction

Figure 4:
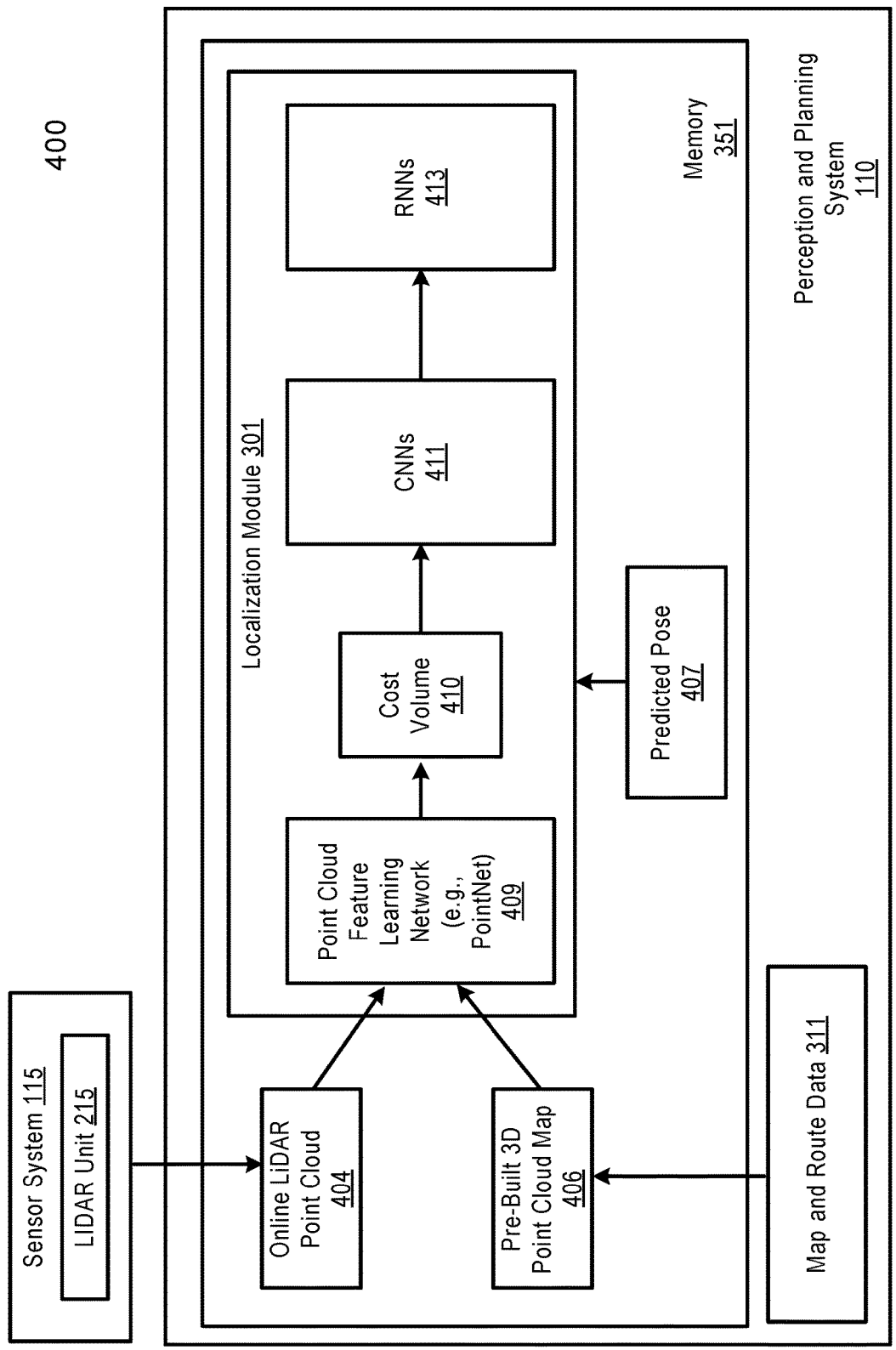
FIG. 4 illustrates a learning-based LiDAR localization system in accordance with an embodiment of the invention.

FIG. 4 illustrates a learning-based LiDAR localization system in accordance with an embodiment of the invention. As shown in FIG. 4, the localization module 301 can include a point cloud feature learning network (e.g., a PointNet) 409. The point cloud feature learning network 409 can take a pre-built 3D point cloud map 406, an online LiDAR point cloud 404, and a predicted pose 407 of an ADV as inputs, and extract numerous feature descriptors from the online point cloud 404 based on a number of selected LiDAR points (also referred to as keypoints). Corresponding keypoints can be located and features for the corresponding LiDAR points can be similarly extracted by the point cloud feature learning network 409.

In one embodiment, a cost volume 410 can be constructed based on the feature descriptors extracted from the online point cloud map 404 and the pre-built 3D point cloud map 406. Each cell (i.e., sub volume) of the cost volume can represent a matching cost between one of the first of keypoints and a corresponding keypoints of the second set of keypoints with a given offset. As used herein, in one embodiment, the matching cost can be computed based on a predetermined algorithm to measure similarity between each pair of keypoints (i.e., pre-selected LiDAR points) from the online point cloud 404 and the pre-built 3D point cloud map 406.

As further shown, in one embodiment, the localization module 301 can include a number of CNNs 411, which can be applied to the cost volume 410 to regularize the cost volume 410 so that more contexts in the cost volume 410 can be considered to refine the matching costs. Further, a number of RNNs 413 can be applied to the regularized cost volume to smoothen a trajectory of localization results across a number of sequential LiDAR frames.

In one embodiment, the predicted pose 407 can usually be generated by an inertial measure unit (IMU), or the vehicle dynamics (motion model). The predicted pose 407 can measure the incremental motion between consecutive LiDAR frames. Therefore, the task of the learning-based LiDAR localization system 400 is to seek an optimal offset between the final and predicted poses by minimizing the matching cost between the online point cloud 404 and the 3D point cloud map 406.

In one embodiment, for better efficiency and robustness, the system can estimate the 2D horizontal and heading offset ($\Delta x$, $\Delta y$, $\Delta \psi$) of the ADV only.

In one embodiment, the system 400 represents a deep neutral network architecture that can accurately estimate the ADV's position and orientation using LiDAR scans. In the deep neutral network, as described above, a set of keypoints are evaluated by their linearities defined with the eigenvalues of the neighbors of a 3D point. A group of mini-PointNets can be used to extract feature descriptors, and encode certain statistical properties of the points. The A group of mini-PointNets can be trained to optimize the matching robustness in different scenarios. The system can improve the localization accuracy, yielding comparable results to handcrafted pipelines, in a fully differentiable cost volume over $X*Y*\psi(X, Y \text{ and Yaw})$ dimensions regularized by 3D convolutions. Matching probabilities of dimensions are calculated to obtain the optimal estimation. Thus, using the system 400, temporal motion dynamics that are typically modelled by filtering methods can be implicitly encapsulated by deep recurrent neutral networks (RNN).

As such, in the learning-based LiDAR framework 400, feature descriptor extraction based on mini-PointNets can be trained to be optimal for feature matching robustness, especially over long periods of time outdoors, enabling learning based LiDAR localization. Use of 3D convolutions for learning how to filter and regularize the cost volume 410 over X*Y*yaw dimensions can be enabled by a design of using differentiable geometry transformation and bilinear interpolation of the feature descriptor to boost the localization accuracy.

Figure 5:
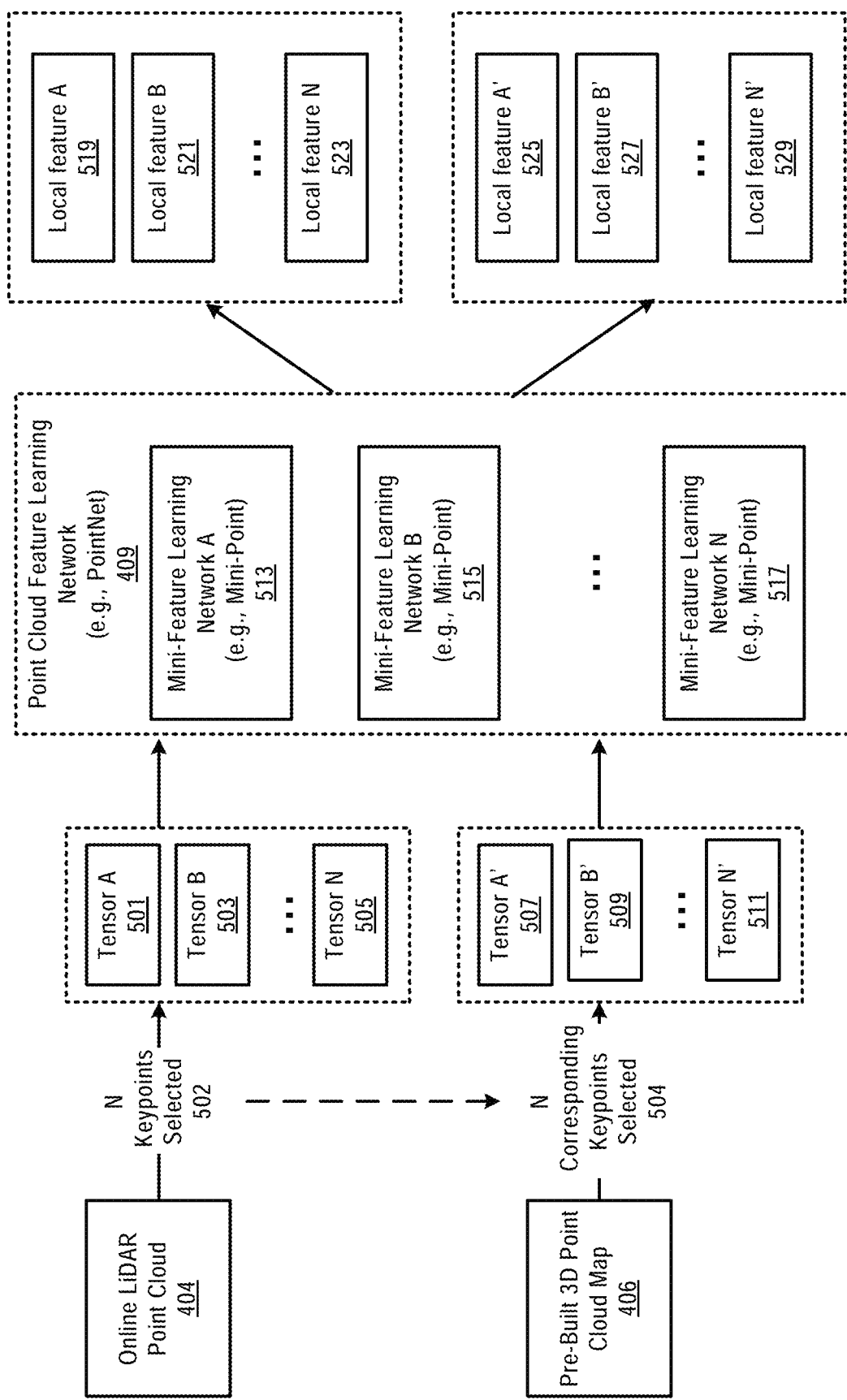
FIG. 5 illustrates a system for extracting point cloud features in accordance with an embodiment.

FIG. 5 illustrates a system for extracting point cloud features in accordance with an embodiment. As shown in FIG. 5, a set of keypoints 502 can be selected from the online point cloud 404 that is generated by a LiDAR device on the ADV for a predicted pose of the ADV. Each keypoint is a LiDAR point and can be selected based on a set of predetermined factors, including density, geometric characteristic, and distribution. A predetermined number of neighboring LiDAR points can be selected for each of selected keypoints. Each selected neighboring point can be associated with multiple attributes, including coordinates and a reflection intensity. The attributes of each neighboring LiDAR points for a selected keypoint can be put into a tensor 501, 503 or 505 and can be provided to one of the mini-feature learning networks 513, 515 and 517, which can extract a feature descriptor 519, 521 and 523 for that selected keypoint.

Figure 6:
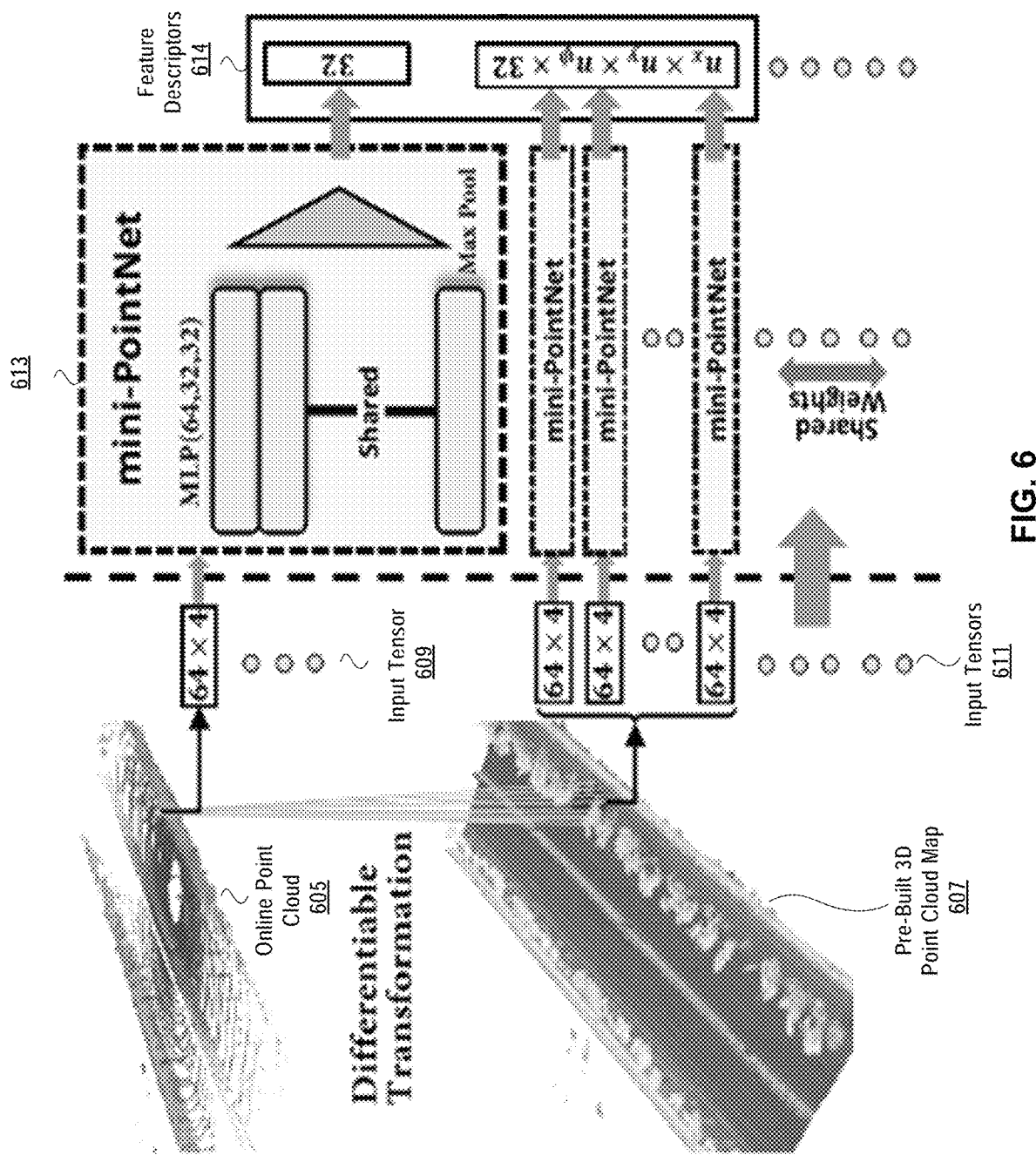
FIG. 6 illustrates an exemplary implementation of a system for point cloud feature extraction in accordance with an embodiment.

In one embodiment, a same number of corresponding keypoints 504 can be located on the pre-built 3D point cloud map 406. The same predetermined number of neighboring LiDAR points can be similarly located for each corresponding keypoint. Attributes of each neighboring LiDAR points can be included into a tensor 507, 509 and 511, and can be provided to one of the mini-feature learning networks 513, 515 and 517, which can extract a feature descriptor 525, 527 and 529 for that corresponding keypoint FIG. 6 illustrates an exemplary implementation of a system for point cloud feature extraction in accordance with an embodiment. The exemplary implementation as shown in FIG. 6 includes an online point cloud 605 (i.e., LiDAR point cloud) and a pre-built 3D point cloud map 607. The online LiDAR point cloud 605 can be a single or several consecutive frames from a LiDAR device that is mounted on a vehicle, accumulated from multiple LiDAR scans taking motion compensation into consideration. The online LiDAR point cloud 605 is represented as a set of 3D points $\{P_i|=n\}$, where each point $P_i$ is a vector of (x, y, z, r), which includes its coordinates and reflection intensity in a local vehicle or LiDAR coordinate system.

The pre-built 3D point cloud map 607 is a collection of LiDAR points with global coordinates collected by surveying or mapping vehicles. For better storage efficiency, the 3D point cloud map 607 is down-sampled using a voxel grid filter. Furthermore, a semantic segmentation using Point-Net++ is performed to remove dynamic objects like vehicles, bicycles, pedestrians, etc., in the point cloud map.

As a first step, the system can extract local feature descriptors from a set of local patches (also referred to as keypoints). The selection of keypoints considers several local and global geometry characteristics from different aspects. After the keypoint selection, feature descriptors are extracted using a mini-version of PointNet 613.

From the online point cloud 605, a fixed number of keypoints are extracted considering some factors including density, geometric characteristic, and distribution. First, all LiDAR points in the online point cloud 605 are traversed to locate candidates with a predetermined point density in their neighborhood. Then, the linearity of each candidate keypoint is evaluated using a 3D structure tensor Features with strong linear structures are considered to be suitable for the localization task because of their uniqueness and richness in common road scenes. Third, candidate keypoints are sorted by their linearity from the most significant to the least so that a minimum number of keypoints are selected. The newly selected keypoints need to maintain enough distance from the existing ones.

Once the qualified keypoints have been selected, meaningful feature descriptors for them can be extracted. Although conventional feature (e.g., simple geometric or statistical features) are used to describe the similarity between point clouds using features learned by deep networks, PointNet is used to extract feature descriptors to address the issue of consuming unordered points in a network architecture.

More specifically, in one example, for each keypoint, a vertical cylinder can be applied along the z-axis to collect 64 neighboring points. For horizontal localization, the neighboring points in the vertical cylinder can construct more meaningful features comparing to the spherical searching area. For each neighboring point, the relative ordinates to the keypoint and its reflection intensity (x, y, z, r) are used for descriptor extraction. Therefore, the input of the mini-PointNet network is a 64×4 tensor 609 or 611; the output is a 32-dimensional vector 614 representing local feature of the keypoint patch, which can be from either the online point cloud 605 or the pre-built 3D point cloud map 607.

The mini-version PointNet 613 for feature extraction can include a multilayer perceptron (MLP) of 3 stacking fully connected layers and a max-pooling layer to aggregate and obtain the feature descriptor.

For extract features from both the online point cloud 605 and the offline 3D point cloud map 6078, the parameter-shared mini-PointNet structure 613 can be used. For a particular map point, if the minimum number of neighboring points is not seen around the map point, the map point is considered an empty map point/keypoint. A FCN can be used to learn the feature descriptor representation of the empty map point wherein the input to the network can be set as a unit vector.

The parameters and thresholds of the implementation are described below:

During the keypoint selection, 128 keypoints within a frame of the LiDAR point cloud 605 can be selected. As used herein, a frame is revolution or swing of a LiDAR unit. Then, 64 neighboring points of each keypoint within a cylinder along the z-axis with a 0.5 m radius are selected for feature descriptor extraction. The minimum allowed number of neighboring points is set to 16. The 64*4 input vector 609 of a keypoint is simply filled repeatedly by valid neighboring points, if there are 16-64 neighboring points. Otherwise, an map point would be considered empty. The solution space of a cost volume is set as 11*11*11, and the steps in x, y and $\psi$ dimensions are 0.25 m, 0.25 m and 0.5 degree respectively. Therefore, the maximum affordable offset of the predicted pose is about (0.25*(11−1)/2=1.25 m, 1.25 m, and 2.5 degree). In this implementation, the mini-PointNet structure is 64*32*32 MLP, 3D CNNs are Conv3d (16, 1, 1)–Conv3d (4, 3, 1)–Conv3d (1, 3, 1), and RNNs are a two layer LSTM with 11 hidden states.

Figure 7:
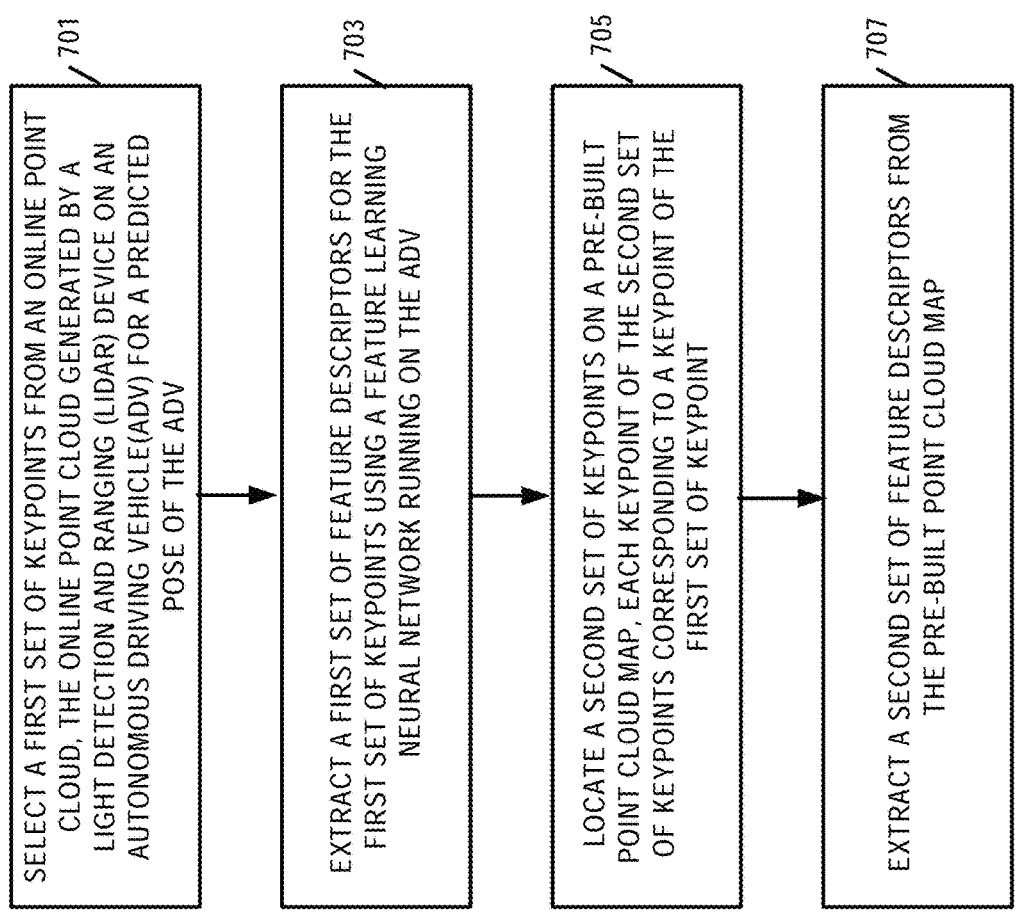
FIG. 7 illustrates a flow diagram illustrating an example process of extracting point cloud features in accordance with an embodiment.

FIG. 7 illustrates a flow diagram illustrating an example process of extracting point cloud features in accordance with an embodiment. Process 700 may be performed by processing logic which may include software, hardware, or a combination thereof. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 700 may be performed by one or more of modules as illustrated in FIG. 3A and FIG. 3B.

Referring to FIG. 7, in operation 701, a first set of keypoints is from an online point cloud, the online point cloud generated by a LiDAR) device on the ADV for a predicted pose of the ADV. Each of the first set of keypoints is a LiDAR point. When selecting the first set of keypoints, all LiDAR points in a predetermined area around the predicted pose of the ADV can be traversed to locate a number of candidate LiDAR points, each candidate LiDAR point having a predetermined density of LiDAR points in a neighborhood of that candidate LiDAR point. A linearity of each of the candidate LiDAR points can be evaluated using a 3D structure tensor. The linearity of each candidate LiDAR points can be assigned a value based on the evaluation. The candidate LiDAR points can be sorted based on their assigned values. The fixed number of candidate LiDAR points can be selected based on the sorted candidate LiDAR points. When selecting the fixed number of candidate LiDAR points, each newly selected LiDAR point needs to maintain a predetermined distance from one or more existing LiDAR points that have been selected.

In operation 703, a first set of feature descriptors for the first set of keypoints can be extracted using a feature learning neural network running on the ADV. A cylinder along a z-axis of the keypoint can be applied to collect a predetermined number of neighboring LiDAR points for each selected keypoint, each neighboring LiDAR point having a reflection intensity and a relative coordinate to that keypoint. Features for each keypoint can be extracted by a neutral network based on the attributes of the associated neighboring LiDAR points for each selected keypoint.

In operation 705, a second set of keypoints can be located on a pre-built point cloud map, each keypoint of the second set of keypoints corresponding to a keypoint of the first set of keypoint. The corresponding coordinates in the 3D map can be computed using a transform expressed by a 2*2 rotation matrix and a 2D translation vector.

In operation 707, a second set of feature descriptors from the pre-built point cloud map in a manner similar to how the first set of feature descriptors are extracted from the online point cloud.

Using CNNs for Solution Inference

Figure 8:
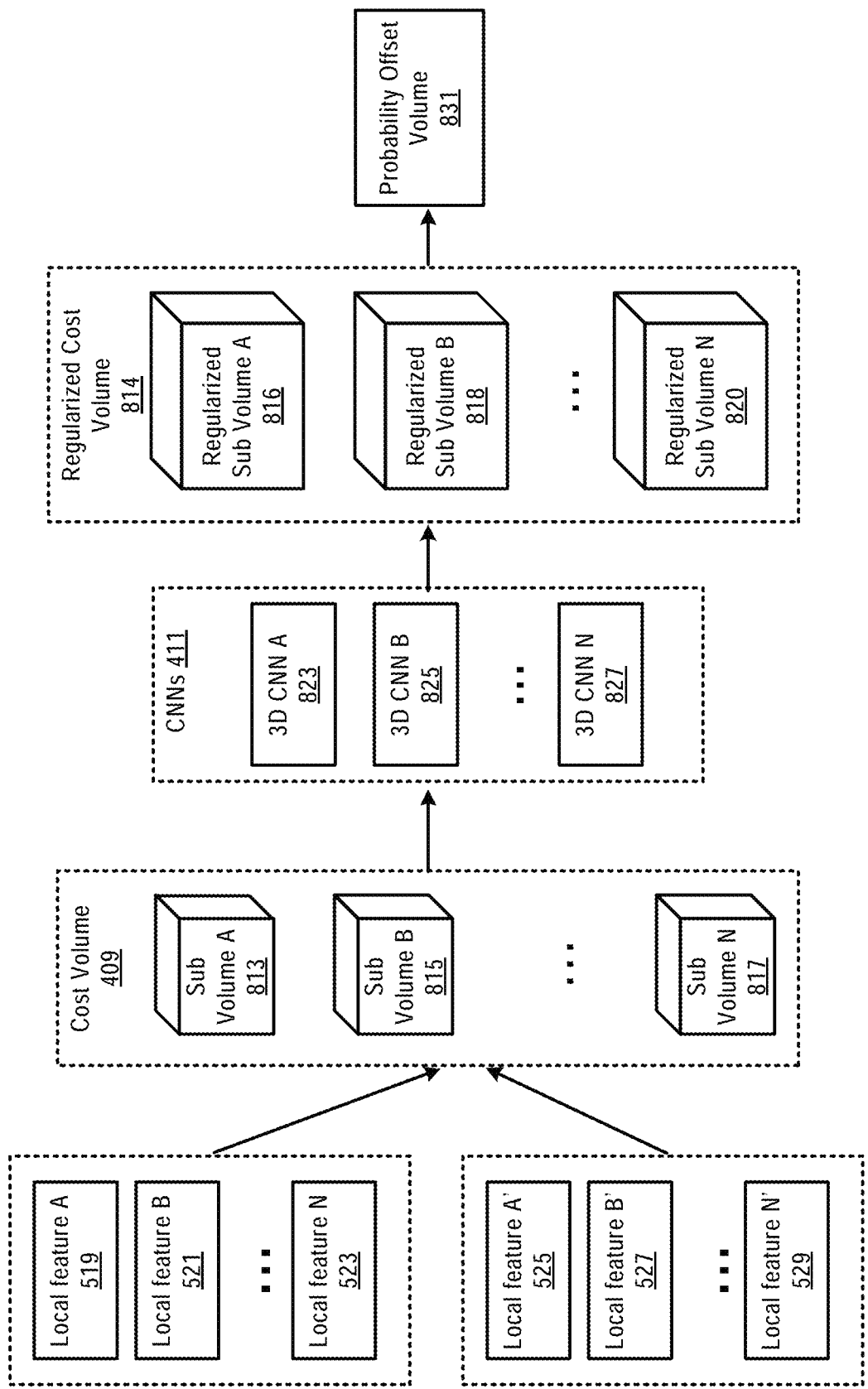
FIG. 8, illustrates a system for solution inference using neural networks in LiDAR localization in accordance with an embodiment.

FIG. 8, illustrates a system for solution inference using neural networks in light detection and range (LiDAR) localization in accordance with an embodiment.

As shown in FIG. 8, the cost volume 409 can include a number of sub volumes (also referred to as a cell) 813, 815 and 817 constructed from the feature descriptors 519, 521, and 523 extracted from an online point cloud and the feature descriptors 525, 527 and 529 extracted from a pre-built point cloud map.

Each of the sub volumes can be provided to one of a number of CNNs 411 (e.g., 3D CNN A 823, 3D CNN B 825, and 3D CNN N 827) to regularize the sub volume. The output of 3D CNNs can be one of regularized sub volumes 814 (e.g., regularized sub volume A 816, regularized sub volume B 818, or regularized sub volume N 820). In each regularized sub volume, matching costs are refined. For each solution ($\Delta$xi, $\Delta$yj, $\Delta\psi$k) in the solution space (x, y, $\psi$), the difference between N descriptor pairs of the on-line point cloud and the existing map is solved. The difference is reduced by using the CNNs, so that it is easy to calculate and obtain the solution with the smallest difference.

As shown in FIG. 8, the regularized cost volume 814 can be further compressed to a probability offset volume 831 to represent the consensus of keypoints in the offset space, which is a $n_x*n_y*n_\psi$ volume that represents the overall matching cost between an online point cloud and a 3D point cloud map given the offset.

Figure 9:
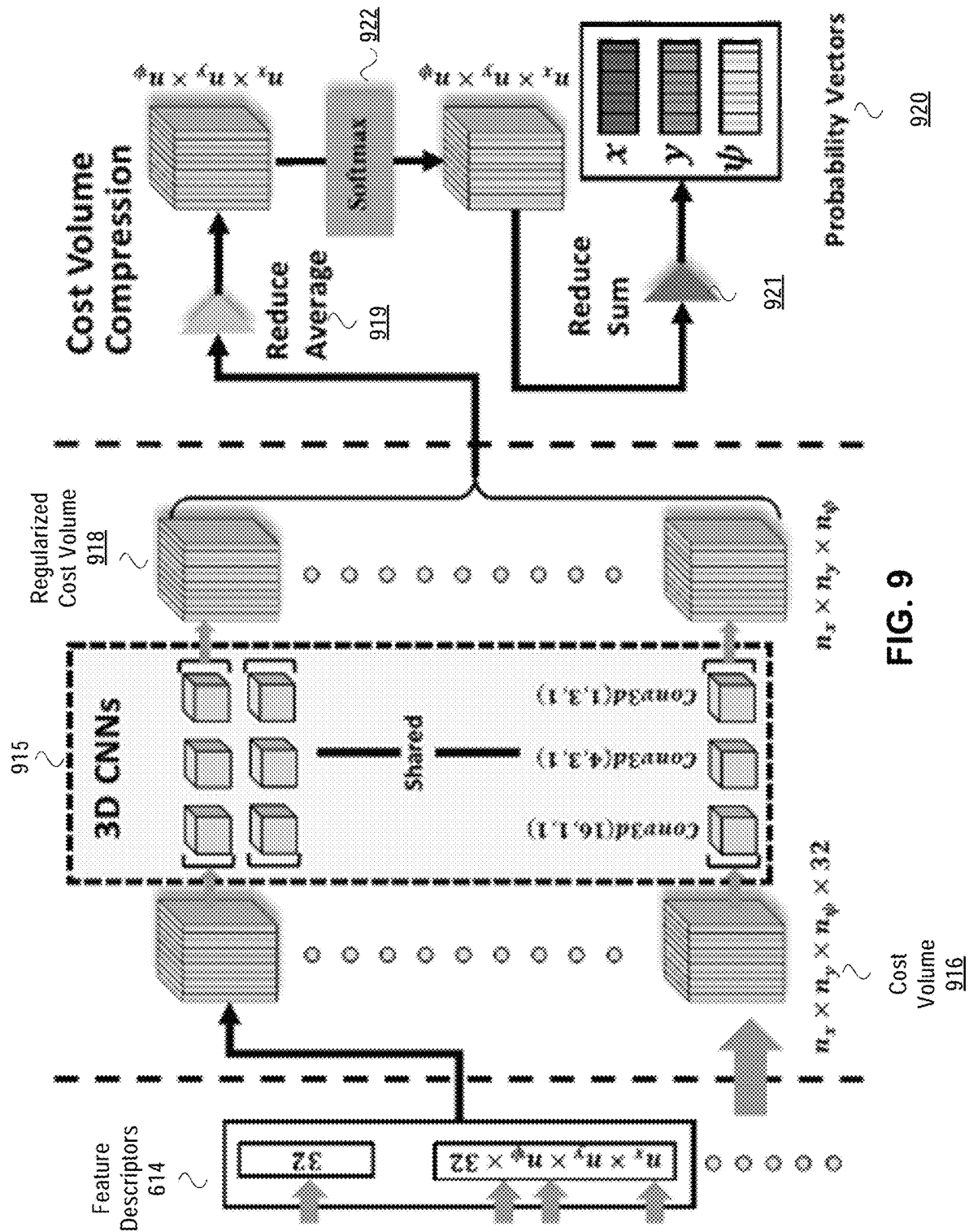
FIG. 9 illustrates an exemplary implementation of a system for solution inference using neural networks in LiDAR localization in accordance with an embodiment.

FIG. 9 illustrates an exemplary implementation of a system for solution inference using neural networks in LiDAR localization in accordance with an embodiment.

As shown in FIG. 9, the exemplary system described herein represents a network that can be used to accurately infer a localization offset ($\Delta$x, $\Delta$y, $\Delta\psi$). This is done by constructing a cost volume 916 in the solution space (x, y, $\psi$) and regularizing it with 3D convolutional neural networks (3D CNNs). First of all, the system is to divide the solution space into discrete spaces in x, y, $\psi$ dimensions, and to denote $n_x$, $n_y$, $n_\psi$ as the size in each dimension. The system subsequently denotes $\{f_1, \ldots, f_N\}$ as the keypoint descriptors of the online LiDAR point cloud. Therefore, the cost volume can be calculated as $N*n_x*n_y*n_\psi$. Each cell can represent the matching cost between the corresponding keypoint and the 3D map point with the given offset.

Given a predicted pose, local keypoints of the online point cloud are transformed to their global coordinates. The neighborhood of the predicted pose in x, y and yaw dimensions, denoted as $\{(\Delta x_i, \Delta y_j, \Delta\psi_k)\ 1\leq i\leq n_x, 1\leq n_x\leq j\ n_y, 1\leq k\leq n_\psi\}$, can be divided into multiple discrete spaces. The corresponding coordinates in the 3D point cloud map can be computed using a transform expressed by a 2*2 rotation matrix and a 2D translation vector:

$$\begin{pmatrix} x' \\ y' \end{pmatrix} = \begin{pmatrix} \cos\Delta\psi_k & -\sin\Delta\psi_k \\ \sin\Delta\psi_k & \cos\Delta\psi_k \end{pmatrix} \cdot \begin{pmatrix} x \\ y \end{pmatrix} + \begin{pmatrix} \Delta x_i \\ \Delta y_j \end{pmatrix}$$

The neighboring points of the computed corresponding coordinates in the 3D point cloud map are similarly used to extract its feature descriptor through a mini-PointNet structure. Each cell in the cost volume 916 is related to an original keypoint from the online point cloud with its feature descriptor, a transformation, and also a corresponding feature descriptor from the pre-built point cloud map. Furthermore, a bilinear interpolation filter is also applied to refine the corresponding feature descriptor from the map with its four neighbors in x and y dimensions. As a core step to bridge the keypoint features and the regularization network, the transformation and the bilinear interpolation are differentiable, enabling the feature learning in the mini-PointNet structure through backpropagation during the training stages. With the descriptor pair from the online point cloud and the map, a $N*n_x*n_y*n_\psi$ cost volume can be formed in the offset solution space, by computing the metric distance between them, which is the input of the regularization network. Metric distance is a 32-dimensional vector, in which each element is calculated by squared L2 distance from the corresponding one in the descriptor pair.

Given the above input, a regularization function which is able to take into account the context in this volume and refine matching costs can be learned. Since the matching costs in the offset space were calculated independently for each keypoint, they are not desirable, even if they were using deep feature representations.

3D convolutions 915 provided herein can be used for volume regularization to effectively improve the localization precision. The 3D CNNs 915 consist of three layers. The first two 3D convolutional layers use batch normalization and ReLU. The last convolutional layer directly sends its output, omitting the normalization and activation operations. The 3D CNNs 915, which share the same parameters, is performed on each $n_x*n_y*n_\psi$ sub volume, and can substantially increase the speed of convergence and effectively avoid over-fitting.

As shown in FIG. 9, one or more regularized cost volumes 918 can be generated by the 3D CNNs 915. The regularized cost volumes or sub volumes include matching costs of all offset configurations $\{\Delta x_i, \Delta y_j, \Delta \psi_k\}$ for each keypoint independently.

In one embodiment, a probability offset volume can be calculated to represent the consensus of all keypoints in the offset space, which is a $n_x*n_y*n_\psi$ volume. The probability offset volume can represent the overall matching cost between the online point cloud and the 3D map given the offset.

In one embodiment, when keypoints are independent of each other, the matching probability of an offset $\Delta T=\{\Delta x_i, \Delta y_j, \Delta \psi_k\}$ can be calculated by the formula $\Pi_{i=1}^N P_i(\Delta T)$, where $P_i(\Delta T)$ represents the matching probability of i-th keypoint at offset $\Delta T$.

In one embodiment, the above equation can be converted into log-likelihood:

$$C(\Delta T) \propto \log\left(\sum_{i=1}^N P_i(\Delta T)\right) = \sum_{i=1}^N (\log(P_i(\Delta T))).$$

In the above formula, $C(\Delta T)$ represents the overall matching cost at offset $\Delta T$ between the online point cloud and the 3D point cloud map. In this exemplary implementation as shown in FIG. 9, the above cost $\log(P_i(\Delta T))$ is taken as input, and can be compressed into a $n_x*n_y*n_\psi$ cost volume across the keypoint dimension by applying a reduce average operation 919, which corresponds to the overall matching costs $C(\Delta T)$.

In one embodiment, the value of each cell in the compressed cost volume is the overall matching cost of the corresponding offset. A softmax operation 922 can be applied along x, y, and yaw dimensions to convert the matching costs $C(\Delta T)$ into probabilities $C(\Delta T)$. A probability offset volume $P(\Delta T)$ can be further compressed into probability vectors across x, y and yaw dimensions by applying a reduce sum operation 921: $P_i(\Delta x_i)=\Sigma_{y,\psi}P(\Delta T)$, $(\Delta y_j)=\Sigma_{x,\psi}P(\Delta T)$ and $P(\Delta \psi_k)=\Sigma_{x,y} P(\Delta T)$.

Figure 10:
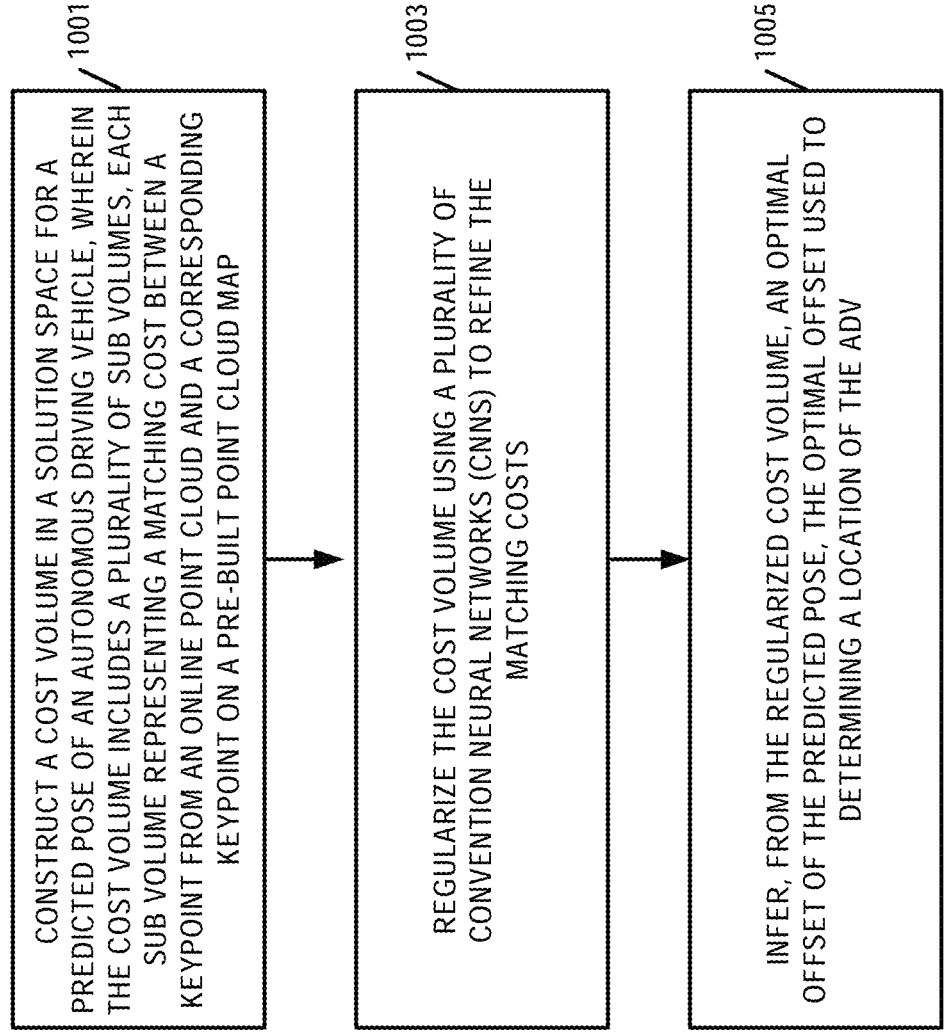
FIG. 10 illustrates a flow diagram illustrating an example process of solution inference using neural networks in LiDAR localization in accordance with an embodiment.

FIG. 10 illustrates a flow diagram illustrating an example process of solution inference using neural networks in LiDAR localization in accordance with an embodiment. Process 1000 may be performed by processing logic which may include software, hardware, or a combination thereof. Process 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 1000 may be performed by one or more of modules as illustrated in FIG. 3A and FIG. 3B.

Referring to FIG. 10, in operation 1001, a cost volume is constructed in a solution space for a predicted pose of an autonomous driving vehicle. The cost volume includes a number of sub volumes, each sub volume representing a matching cost between a keypoint from an online point cloud and a corresponding keypoint on a pre-built point cloud map.

In operation 1003, the cost volume is regularized using a plurality of convention neural networks (CNNs) to refine the matching costs. Further, the cost volume can be regularized so that more contexts in the cost volume can be considered to refine the matching costs. Further, a number of RNNs can be applied to the regularized cost volume to smoothen a trajectory of localization results across a number of sequential LiDAR frames. In operation 1005, an optimal offset of the predicted pose from a ground truth can be inferred, the optimal offset used to determining a location of the ADV.

Temporal Smoothness in Localization Results

Figure 11:
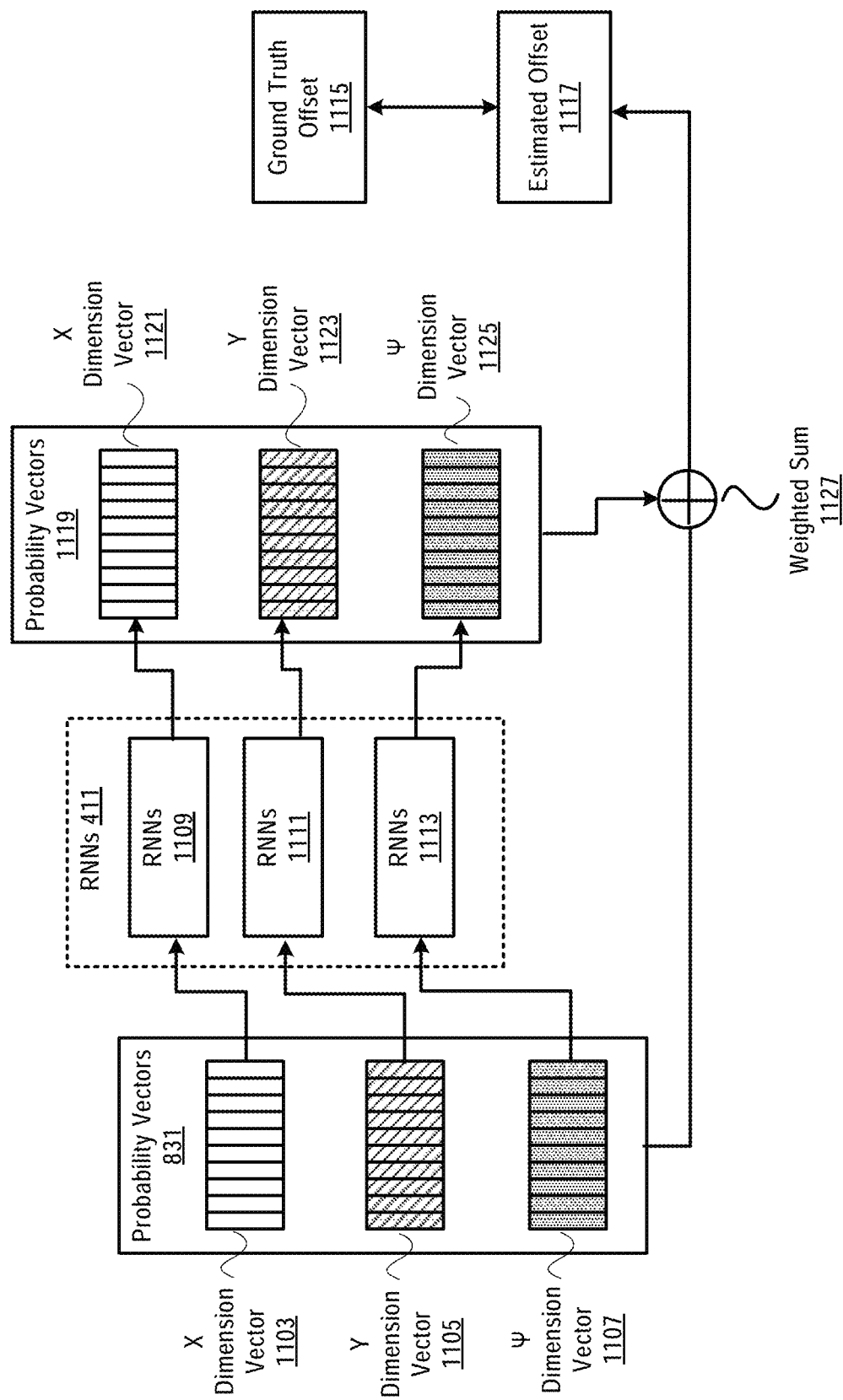
FIG. 11 illustrates a system for temporal smoothness in localization results for an ADV in accordance with an embodiment.

FIG. 11 illustrates a system for temporal smoothness in localization results for an ADV in accordance with an embodiment.

As shown in FIG. 11, the probability vectors 831 can be provided as inputs to a number of RNNs 1109, 1111, and 1113 for temporal smoothness. Each RNN includes multiple long short term memory (LSTM) units. Each of the probability vectors 1103, 1105 and 1108 can be provided as an input to one of the RNNs, which can generate a corresponding probability vector 1121, 1123 or 1125. A weighted sum 1127 of the corresponding probability vectors 121, 1123 and 1125 can be computed, and used in conjunction with the original probability vectors 1103, 1105 and 1107 to obtain an estimated offset 1117. With the estimated offset 1117 and a ground truth offset, an optimal pose of the ADV can be determined.

In one embodiment, the system described herein can smoothen the trajectory of location results across the sequential LiDAR frames based on learned historical information from the sequential LiDAR frames. The ADV can have multiple predicted poses across the sequential LiDAR frames.

Figure 12:
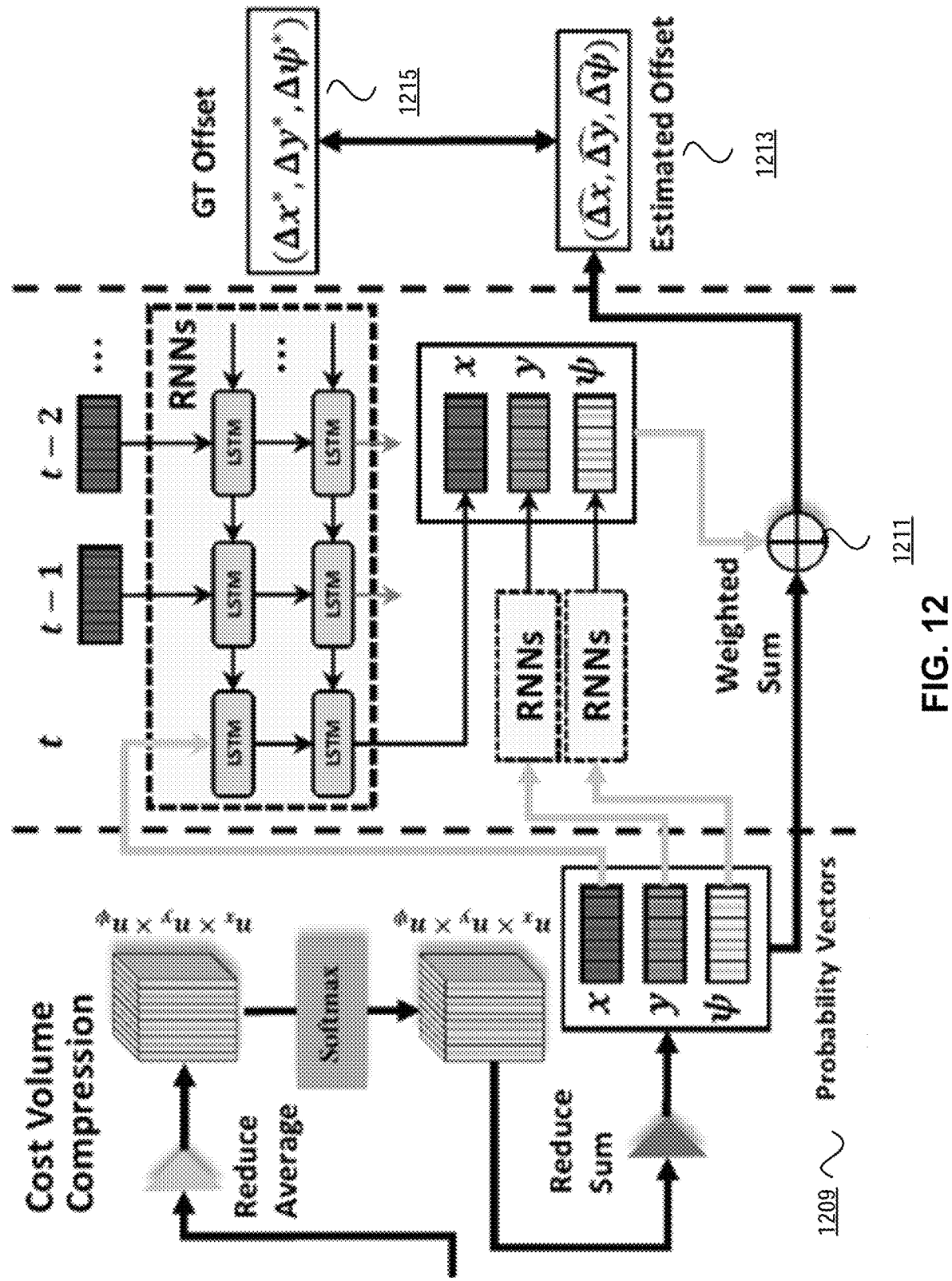
FIG. 12 illustrates an exemplary implementation of a system for temporal smoothness in localization results for an ADV in accordance with an embodiment.

FIG. 12 illustrates an exemplary implementation of a system for temporal smoothness in localization results for an ADV in accordance with an embodiment.

As described above, matchings between an online point cloud and a pre-built point cloud map are spatial. Therefore, the probability offset volumes of sequential LiDAR frames are independent of each other. However, the localization task is a sequential process, so the poses of sequential frames should be considered jointly. In traditional methods, the historical distributions within the histogram filter are propagated to estimate the current matching distribution, which ensures the temporal smoothness of the output.

The exemplary implementation uses recurrent neural networks (RNNs) to achieve similar temporal smoothness. To be more specific, LSTM units are used. Each of the probability vectors 1209 for the dimensions (x, y, ψ) from a probability offset volume described above can be treated as the input of each parameter independent RNNs unit. Through learning of historical information by RNNs, the trajectory of localization results would be smoother and more accurate.

In one embodiment, without using a feature space distance as a loss, the exemplary implementation directly defines loss as squared L2 distance between the estimated offset $\Delta T=(\hat{\Delta}x,\hat{\Delta}y,\hat{\Delta}\phi)$ and the ground truth offset $\Delta T^*=(\Delta x^*, \Delta y^*, \Delta \phi^*)$. The estimated offset 1213 can then be calculated by:

$$\hat{\Delta T} = \left( \sum_{i=1}^{n_x} P_i(\Delta x_i)\cdot \Delta x_i, \sum_{j=1}^{n_x} P_j(\Delta y_j)\cdot \Delta y_j, \sum_{k=1}^{n_\psi} P_k(\Delta \psi_k)\cdot \Delta \psi_k \right)$$

The loss function can therefore be defined as:
Loss=α·($\|\hat{\Delta} x-\Delta x^*\|^2 + \|\hat{\Delta}y - \Delta y^*\|^2$)+$\|\hat{\Delta}\psi-\Delta\psi^*\|^3$ where α is a balancing factor.

Figure 13:
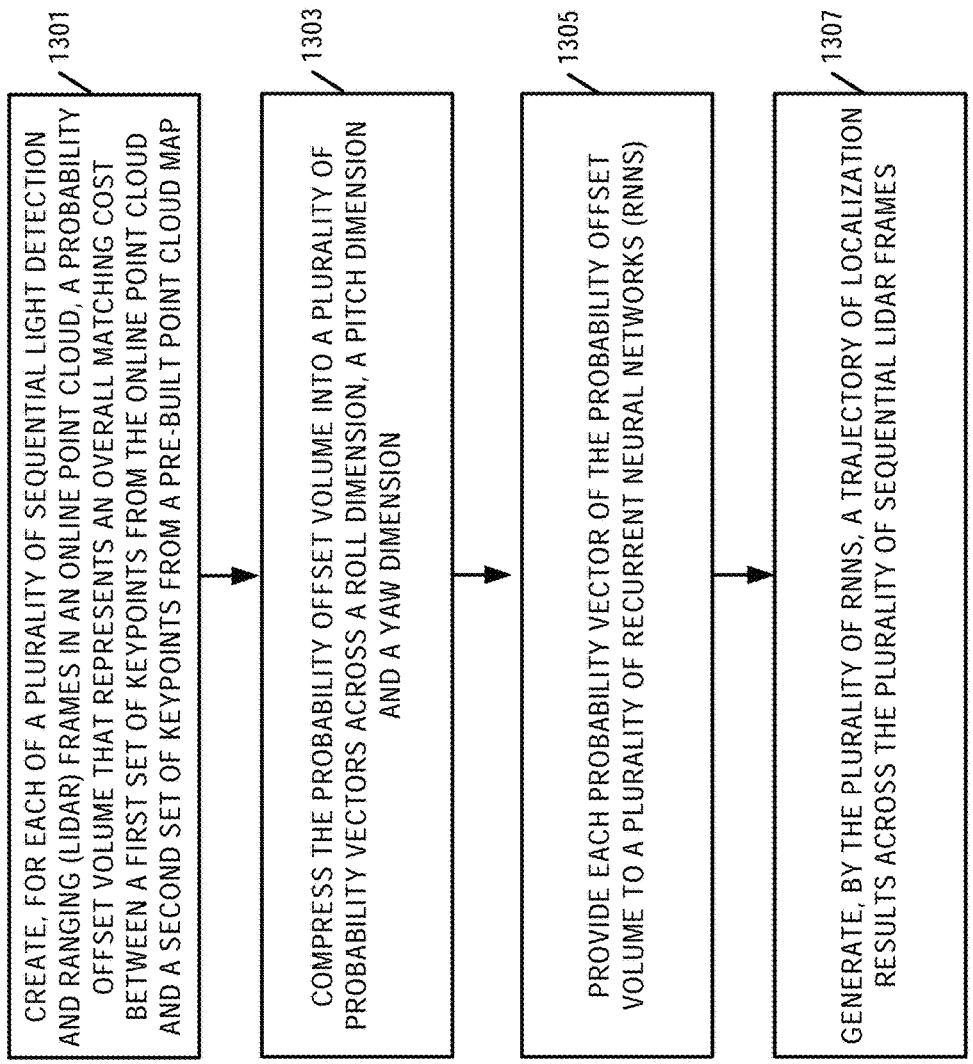
FIG. 13 is a flow diagram illustrating an example process of temporal smoothness in localization results for an ADV in accordance with an embodiment.

FIG. 13 is a flow diagram illustrating an example process of temporal smoothness in localization results for an ADV in accordance with an embodiment.

Process 1300 may be performed by processing logic which may include software, hardware, or a combination thereof. Process 1300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 1300 may be performed by one or more of modules as illustrated in FIG. 3A and FIG. 3B.

Referring to FIG. 13, in operation 1301, a probability offset volume is created, for each of a number of sequential light detection and ranging (LiDAR) frames in an online point cloud. The probability offset volume represents an overall matching cost between a first set of keypoints from the online point cloud and a second set of keypoints from a pre-built point cloud map. In operation 1303, the probability offset volume is compressed into a number of probability vectors across a X dimension, a Y dimension and a yaw dimension. In operation 1305, each probability vector of the probability offset volume is provided to recurrent neural networks (RNNs) for processing. In operation 1307, the RNNs generate a trajectory of localization results across the plurality of sequential LiDAR frames.

Figure 14:
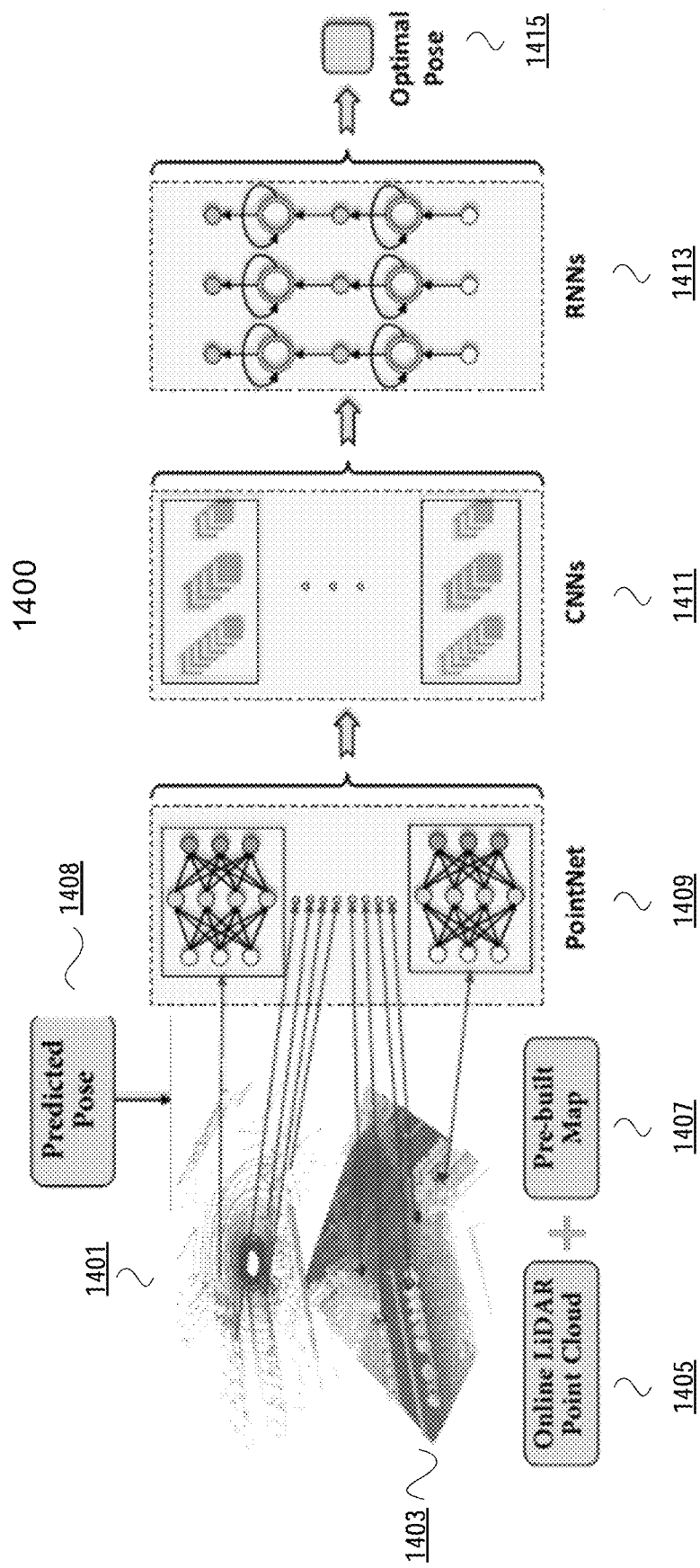
FIG. 14 illustrates an overall architecture of a learning-based LiDAR localization system 1400 in accordance with an embodiment.

FIG. 14 illustrates an overall architecture of a learning-based LiDAR localization system 1400 in accordance with an embodiment. As shown in FIG. 14, the system 1400 takes online LiDAR scans 1400 and 1405, a pre-built point cloud map 1403 and 1407, a predicted pose 1408 as inputs; and learns features by a PointNet 1409, constructs cost volumes over the solution space, applies CNNs 1411 and RNNs 1413 to estimate an optimal pose 1415.

Figure 15:
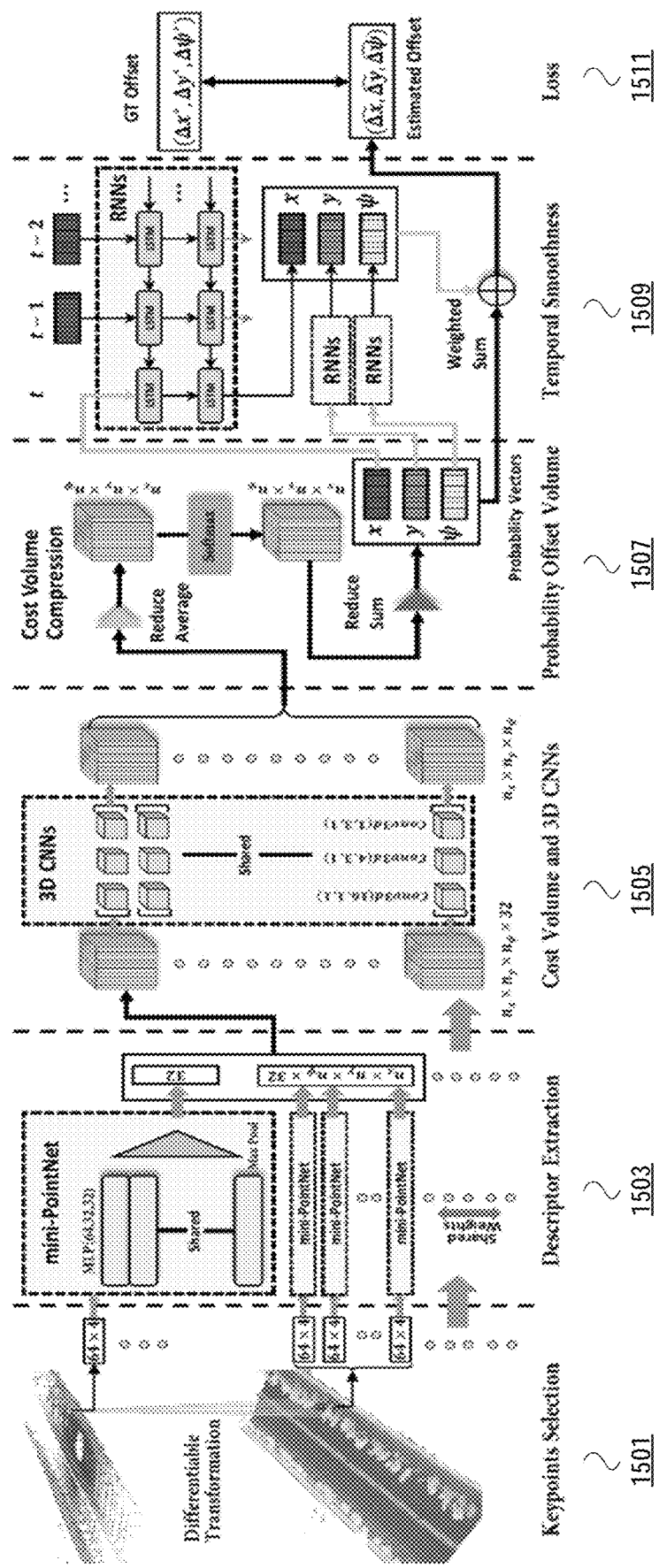
FIG. 15 illustrates, in more details, an overall architecture of a learning-based LiDAR localization system 1500 in accordance with an embodiment.

FIG. 15 illustrates, in more details, an overall architecture of a learning-based LiDAR localization system 1500 in accordance with an embodiment. As shown in FIG. 15, the system 1500 includes a keypoint selection stage 1501, a feature descriptor 1503 state, a cost volume creation and 3D CNNs application stage 1505, a probability offset volume creation stage 1507, a temporal smoothness stage 1509, and an estimated offset creation stage 1511. As further shown, in each stage, a corresponding structure (e.g., one or more components and inputs) can be provided to implement operations and functionality for that stage. These structures are described above in this disclosure.

As an illustrative example, the system 1500 can be trained using a 2-step strategy. In the first step, only the mini-PointNet structure in the descriptor extraction stage 1503 and the 3D CNNs for the cost volume creation stage 1503 are trained. In order to achieve this, RNNs for the temporal smoothness stage 1509 in the network architecture are removed, and loss is directly calculated from the probability vectors inferred from the probability offset volume. The batch size and the learning rate are set to be 1 and 0.1 respectively. In order to make the extracted features more robust, a uniformly distributed random noise of [0~1.0]m is added in x-y dimension, and a random error of [0~2.0]° is added in yaw dimension to the input predicted pose.

In the second step, parameters of RNNs with those fixed in the mini-PointNet structure and the 3D CNNs are trained. The batch size and the learning rate are set to be 1 and 0.001, respectively. The sequences with a length of 10 are sampled during the RNNs training. Given that the frequency of LiDAR frames is 10 hz, the actual receptive field of RNNs is about 1.0 second. In these two steps, the training dataset is randomly divided into the training and validation set, yielding the ratio of training to validation as 4 to 1. The training is stopped at 100 epochs for these two steps when there is no performance gain.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 16:
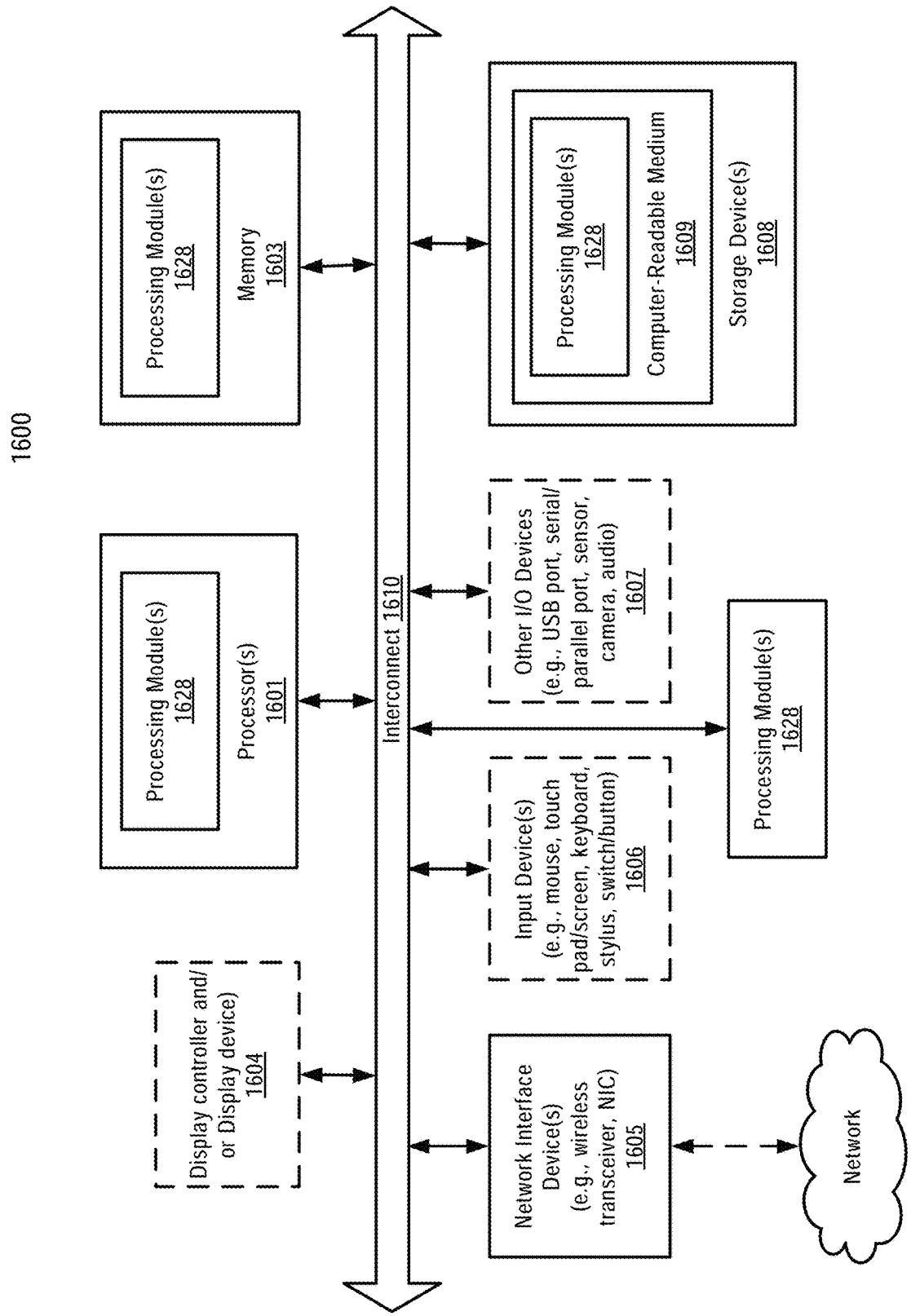
FIG. 16 is a block diagram illustrating an example of a data processing system which may be used with one embodiment of the disclosure.

FIG. 16 is a block diagram illustrating an example of a data processing system which may be used with one embodiment of the disclosure. For example, system 1600 may represent any of data processing systems described above performing any of the processes or methods described above. System 1600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1600 is intended to show a high level view of many components of the computer system. However, it is to be understood that additional components may be present in certain implementations and furthermore, different arrangement of the components shown may occur in other implementations. System 1600 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1600 includes processor 1601, memory 1603, and devices 1605-1608 connected via a bus or an interconnect 1610. Processor 1601 may represent a single processor or multiple processors with a single processor core or multiple processor cores included therein. Processor 1601 may represent one or more general-purpose processors such as a microprocessor, a central processing unit (CPU), or the like. More particularly, processor 1601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1601 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1601, which may be a low power multi-core processor socket such as an ultra-low voltage processor, may act as a main processing unit and central hub for communication with the various components of the system. Such processor can be implemented as a system on chip (SoC). Processor 1601 is configured to execute instructions for performing the operations and steps discussed herein. System 1600 may further include a graphics interface that communicates with optional graphics subsystem 1604, which may include a display controller, a graphics processor, and/or a display device.

Processor 1601 may communicate with memory 1603, which in one embodiment can be implemented via multiple memory devices to provide for a given amount of system memory. Memory 1603 may include one or more volatile storage (or memory) devices such as random access memory (RAM), dynamic RAM (DRAM), synchronous DRAM (SDRAM), static RAM (SRAM), or other types of storage devices. Memory 1603 may store information including sequences of instructions that are executed by processor 1601, or any other device. For example, executable code and/or data of a variety of operating systems, device drivers, firmware (e.g., input output basic system or BIOS), and/or applications can be loaded in memory 1603 and executed by processor 1601. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1600 may further include IO devices such as devices 1605-1608, including network interface device(s) 1605, optional input device(s) 1606, and other optional IO device(s) 1607. Network interface device 1605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1606 may include a mouse, a touch pad, a touch sensitive screen (which may be integrated with display device 1604), a pointer device such as a stylus, and/or a keyboard (e.g., physical keyboard or a virtual keyboard displayed as part of a touch sensitive screen). For example, input device 1606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1607 may include an audio device. An audio device may include a speaker and/or a microphone to facilitate voice-enabled functions, such as voice recognition, voice replication, digital recording, and/or telephony functions. Other IO devices 1607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1610 via a sensor hub (not shown), while other devices such as a keyboard or thermal sensor may be controlled by an embedded controller (not shown), dependent upon the specific configuration or design of system 1600.

To provide for persistent storage of information such as data, applications, one or more operating systems and so forth, a mass storage (not shown) may also couple to processor 1601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1601, e.g., via a serial peripheral interface (SPI). This flash device may provide for non-volatile storage of system software, including BIOS as well as other firmware of the system.

Storage device 1608 may include computer-accessible storage medium 1609 (also known as a machine-readable storage medium or a computer-readable medium) on which is stored one or more sets of instructions or software (e.g., module, unit, and/or logic 1628) embodying any one or more of the methodologies or functions described herein. Processing module/unit/logic 1628 may represent any of the components described above, such as, for example, planning module 305, and control module 306. Processing module/unit/logic 1628 may also reside, completely or at least partially, within memory 1603 and/or within processor 1601 during execution thereof by data processing system 1600, memory 1603 and processor 1601 also constituting machine-accessible storage media. Processing module/unit/logic 1628 may further be transmitted or received over a network via network interface device 1605.

Computer-readable storage medium 1609 may also be used to store the some software functionalities described above persistently. While computer-readable storage medium 1609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1628, components and other features described herein can be implemented as discrete hardware components or integrated in the functionality of hardware components such as ASICS, FPGAs, DSPs or similar devices. In addition, processing module/unit/logic 1628 can be implemented as firmware or functional circuitry within hardware devices. Further, processing module/unit/logic 1628 can be implemented in any combination hardware devices and software components.

Note that while system 1600 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for localizing an autonomous driving vehicle (ADV), the computer-implemented method comprising:
    selecting a first set of keypoints from an online point cloud, the online point cloud generated by a light detection and ranging (LiDAR) device on the ADV;
    extracting a first set of feature descriptors for the first set of keypoints using a feature learning neural network running on the ADV;
    locating a second set of keypoints on a pre-built point cloud map, each keypoint of the second set of keypoints corresponding to a keypoint of the first set of keypoints;
    extracting a second set of feature descriptors from the pre-built point cloud map;
    constructing a cost volume from the first set of feature descriptors and the second set of feature descriptors, where the cost volume includes a plurality of cells, each cell representing a matching cost between one of the first set of keypoints and a corresponding keypoint of the second set of keypoints;
    regularizing the cost volume using a plurality of different types of neural networks to generate additional contexts for refining the matching cost in the cost volume;

and
estimating a position and an orientation of the ADV by minimizing the matching cost in the cost volume.

2. The computer-implemented method of claim 1, wherein the matching cost is associated with a given offset.

3. The computer-implemented method of claim 1, wherein each of the first set of keypoints and the second set of keypoints is a LiDAR point, and has a fixed number of keypoints.

4. The computer-implemented method of claim 3, wherein selecting the first set of keypoints further comprises:
traversing LiDAR points in a predetermined area around the predicted pose of the ADV to locate a plurality of candidate LiDAR points, each candidate LiDAR point having a predetermined density of LiDAR points in a neighborhood of that candidate LiDAR point;
evaluating a linearity of each of the plurality of candidate LiDAR points using a 3D structure tensor to assign a value to the linearity of the candidate LiDAR point;
sorting the plurality of candidate LiDAR points based on their assigned values; and
selecting a fixed number of candidate LiDAR points based on the sorted candidate LiDAR points.

5. The computer-implemented method of claim 4, wherein each newly selected LiDAR point of the fixed number of candidate LiDAR points is to maintain a predetermined distance from one or more existing LiDAR points that have been selected.

6. The computer-implemented method of claim 1, wherein the feature learning neural network comprises a plurality of mini-neural networks, each mini-neural network provided for one of the first set of keypoints, wherein each mini-neural neural network is to
apply a cylinder along a z-axis of the keypoint to collect a predetermined number of neighboring LiDAR points, each neighboring LiDAR point having a reflection intensity and a relative coordinate to that keypoint; and
extract a feature descriptor for the keypoint based on the relative coordinate and reflection intensities of the predetermined number of neighboring LiDAR points.

7. The computer-implemented method of claim 1, wherein the feature learning neural network includes a plurality of mini-neural networks, each mini-neural network provided for one of the second set of keypoints, wherein each mini-neural neural network is to
apply a cylinder along a z-axis of the keypoint to collect a predetermined number of neighboring LiDAR points, each neighboring LiDAR point having a reflection intensity and a relative coordinate to that keypoint; and
extract a feature descriptor for the keypoint based on the relative coordinates
and reflection intensities of the predetermined number of neighboring LiDAR points.

8. The computer-implemented method of claim 7, wherein when the predetermined number of neighboring LiDAR points are not found for a keypoint in the second set of keypoints, a fully connected network is to extract a feature descriptor for the keypoint.

9. The computer-implemented method of claim 1, wherein coordinates for each of the second set of keypoints on the pre-built point cloud map are to be computed using a transform expressed by a 2 by 2 rotation matrix and 2D translation vector.

10. A non-transitory machine-readable medium having instructions stored therein, which when executed by a processor of an autonomous driving vehicle (ADV), cause the ADV to perform operations, the operations comprising:
selecting a first set of keypoints from an online point cloud, the online point cloud generated by a light detection and ranging (LiDAR) device on the ADV;
extracting a first set of feature descriptors for the first set of keypoints using a feature learning neural network running on the ADV;
locating a second set of keypoints on a pre-built point cloud map, each keypoint of the second set of keypoints corresponding to a keypoint of the first set of keypoints;
extracting a second set of feature descriptors from the pre-built point cloud map;
constructing a cost volume from the first set of feature descriptors and the second set of feature descriptors, where the cost volume includes a plurality of cells, each cell representing a matching cost between one of the first set of keypoints and a corresponding keypoint of the second set of keypoints;
regularizing the cost volume using a plurality of different types of neural networks to generate additional contexts for refining the matching cost in the cost volume;
and
estimating a position and an orientation of the ADV by minimizing the matching cost in the cost volume.

11. The non-transitory machine-readable medium of claim 10, wherein the matching cost is associated with a given offset.

12. The non-transitory machine-readable medium of claim 10, wherein each of the first set of keypoints and the second set of keypoints is a LiDAR point, and has a fixed number of keypoints.

13. The non-transitory machine-readable medium of claim 12, wherein selecting the first set of keypoints further comprises:
traversing LiDAR points in a predetermined area around the predicted pose of the ADV to locate a plurality of candidate LiDAR points, each candidate LiDAR point having a predetermined density of LiDAR points in a neighborhood of that candidate LiDAR point;
evaluating a linearity of each of the plurality of candidate LiDAR points using a 3D structure tensor to assign a value to the linearity of each of the plurality of candidate LiDAR points;
sorting the plurality of candidate LiDAR points based on their assigned values; and
selecting a fixed number of candidate LiDAR points based on the sorted candidate LiDAR points.

14. The non-transitory machine-readable medium of claim 13, wherein each newly selected LiDAR point of the fixed number of candidate LiDAR points is to maintain a predetermined distance from one or more existing LiDAR points that have been selected.

15. The non-transitory machine-readable medium of claim 10, wherein the feature learning neural network comprises a plurality of mini-neural networks, each mini-neural network provided for one of the first set of keypoints, wherein each mini-neural neural network is to
apply a cylinder along a z-axis of the keypoint to collect a predetermined number of neighboring LiDAR points, each neighboring LiDAR point having a reflection intensity and a relative coordinate to that keypoint; and
extract a feature descriptor for the keypoint based on the relative coordinate and
reflection intensities of the predetermined number of neighboring LiDAR points.

16. The non-transitory machine-readable medium of claim 10, wherein the feature learning neural network includes a plurality of mini-neural networks, each mini-neural network provided for one of the second set of keypoints, wherein each mini-neural neural network is to
   apply a cylinder along a z-axis of the keypoint to collect a predetermined number of neighboring LiDAR points, each neighboring LiDAR point having a reflection intensity and a relative coordinate to that keypoint; and
   extracting a feature descriptor for the keypoint based on the relative coordinate and reflection intensities of the predetermined number of neighboring LiDAR points.

17. The non-transitory machine-readable medium of claim 16, wherein when the predetermined number of neighboring LiDAR points are not found for a keypoint in the second set of keypoints, a fully connected network is to extract a feature descriptor for the keypoint.

18. The non-transitory machine-readable medium of claim 10, wherein coordinates for each of the second set of keypoints on the pre-built point cloud map are to be computed using a transform expressed by a 2 by 2 rotation matrix and 2D translation vector.

19. A system for localizing an autonomous driving vehicle (ADV), the system comprising:
   a processor; and
   a memory coupled to the processor to store instructions, which when executed by the processor, cause the ADV to perform operations, the operations including;
      selecting a first set of keypoints from an online point cloud, the online point cloud generated by a light detection and ranging (LiDAR) device on the ADV,
      extracting a first set of feature descriptors for the first set of keypoints using a feature learning neural network running on the ADV,
      locating a second set of keypoints on a pre-built point cloud map, each keypoint of the second set of keypoints corresponding to a keypoint of the first set of keypoints,
      extracting a second set of feature descriptors from the pre-built point cloud map,
      constructing a cost volume from the first set of feature descriptors and the second set of feature descriptors, where the cost volume includes a plurality of cells, each cell representing a matching cost between one of the first set of keypoints and a corresponding keypoint of the second set of keypoints,
      regularizing the cost volume using a plurality of different types of neural networks to generate additional contexts for refining the matching cost in the cost volume,
      and
      estimating a position and an orientation of the ADV by minimizing the matching cost in the cost volume.

20. The computer-implemented method of claim 1, wherein the pre-built point cloud map was built using LiDAR points collected by mapping vehicles, wherein dynamic objects were removed from the pre-built point cloud map.

21. The non-transitory machine-readable medium of claim 10, wherein the pre-built point cloud map was built using LiDAR points collected by mapping vehicles, wherein dynamic objects were removed from the pre-built point cloud map.

* * * * *